US012142120B1

(12) United States Patent
Johnson et al.

(10) Patent No.: US 12,142,120 B1
(45) Date of Patent: Nov. 12, 2024

(54) ANTI-SKIMMING BRACKET

(71) Applicant: Walmart Apollo, LLC, Bentonville, AR (US)

(72) Inventors: Christopher Johnson, Bentonville, AR (US); Garrett Fulghum, Bentonville, AR (US); Claire Rushton, Bentonville, AR (US); Jason Hogan, Republic, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/393,509

(22) Filed: Dec. 21, 2023

(51) Int. Cl.
*G07F 7/08* (2006.01)

(52) U.S. Cl.
CPC .................................. *G07F 7/0873* (2013.01)

(58) Field of Classification Search
CPC .................................................... G07F 7/0873
USPC ........................................................ 235/380
See application file for complete search history.

(56) References Cited

U.S. PATENT DOCUMENTS 8,240,566 B1 8/2012 Criscitiello
8,622,297 B1 * 1/2014 Yokomoto ............. G06K 7/082 235/475
11,055,971 B1 * 7/2021 de Castro ............. G07F 7/0873
2013/0146662 A1 * 6/2013 Randolph .............. G06K 7/084 235/439
2017/0249808 A1 8/2017 Markase
2018/0032847 A1 * 2/2018 Goedee ............. G06K 13/0868
2018/0322494 A1 11/2018 Leyden
2019/0213845 A1 7/2019 Goedee et al.

FOREIGN PATENT DOCUMENTS

EP 3012783 B1 * 9/2017 ............ G06K 13/08
GB 2581818 A * 9/2020 ............ G06K 13/02

OTHER PUBLICATIONS

Payment Terminal Stands by ENS, Link 1—Mar. 31, 2016 (Document Creation date) Link 2—Mar. 30, 2018 (Document Creation date) (6 pages).
Lower Anti-Skimming Kit, Keyboard Protection, Verifone MX915, SwivelStands.com Posdata Group, Oct. 22, 2018, (3 pages).
Custom Terminal Stands, Posdata Group, Oct. 22, 2018, (2 pages).
"Four Ways to Protect Your Customers From Credit Card Skimming" ENS www.ens-co.com (2018) 4 pages.

* cited by examiner

*Primary Examiner* — Michael G Lee
*Assistant Examiner* — David Tardif
(74) *Attorney, Agent, or Firm* — Foley IP Law, PLLC

(57) ABSTRACT

An anti-skimming device includes a base configured to be mounted to at least one of a support structure or a card reader device. The base includes mounting openings configured to receive mounting hardware for securing the base to the at least one of the support structure or the card reader device. An arm extends outward from the base. The arm includes a flange extending such that a gap is defined between the flange and the base. The gap is configured to receive at least portion of the card reader device therein such that the flange of the arm overlaps a portion of a front side of the card reader device.

20 Claims, 15 Drawing Sheets

ANTI-SKIMMING BRACKET

BACKGROUND

Card skimming devices are used for theft of customer magnetic stripe data and PIN codes. For example, known skimming devices are overlays that are overlaid on the user interfaces of card reader devices (e.g., debit card readers, credit card readers, point of sale (POS) devices, government assistant card readers, etc.) to capture magnetic stripe data and PIN codes from customers. Currently, there is no known solution for combating the growing use of skimming devices.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

According to a first aspect there is an anti-skimming device that includes a base configured to be mounted to at least one of a support structure or a card reader device. The base includes mounting openings configured to receive mounting hardware for securing the base to the at least one of the support structure or the card reader device. An arm extends outward from the base. The arm includes a flange extending such that a gap is defined between the flange and the base. The gap is configured to receive at least portion of the card reader device therein such that the flange of the arm overlaps a portion of a front side of the card reader device.

According to a second aspect there is an anti-skimming bracket that includes a base configured to be mounted to at least one of a support structure or a card reader device. The base includes mounting openings configured to receive mounting hardware for securing the base to the at least one of the support structure or the card reader device. The mounting openings include at least first and second patterns configured to accommodate respective first and second different mounting configurations of at least one of the support structure or the card reader device. An arm extends outward from the base. The arm includes a flange extending such that a gap is defined between the flange and the base. The gap is configured to receive at least portion of the card reader device therein such that the flange of the arm overlaps a portion of a front side of the card reader device.

According to a third aspect there is an anti-skimming bracket that includes a base configured to be mounted to at least one of a support structure or a card reader device. The base includes mounting openings configured to receive mounting hardware for securing the base to the at least one of the support structure or the card reader device. The base is configured to be mounted to the at least one of the support structure or the card reader device such that the base extends between the support structure and the card reader device. An arm extends outward from the base. The arm includes a flange extending such that a gap is defined between the flange and the base. The gap is configured to receive at least portion of the card reader device therein such that the flange of the arm overlaps a portion of a front side of the card reader device, wherein a size of the gap is adjustable.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 2:
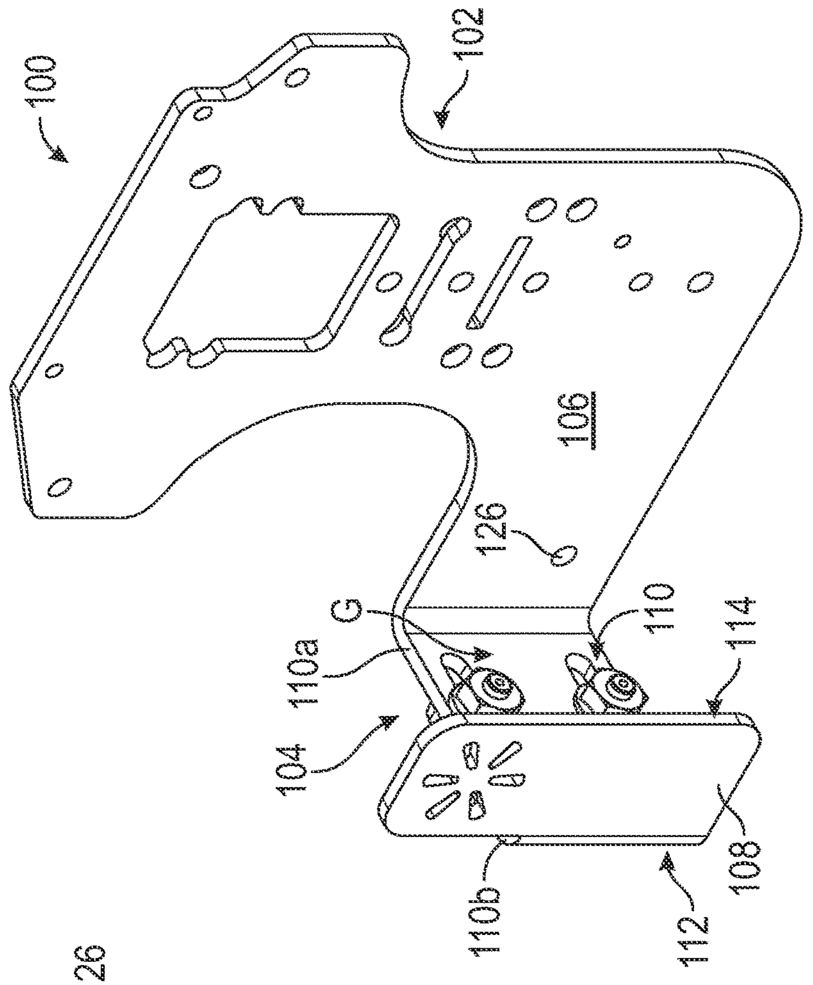
FIG. 2 is another isometric view of the anti-skimming bracket shown in FIG. 1.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

While various spatial and directional terms, such as "top," "bottom," "front," "rear," "upper," "lower," "vertical," "upward," and/or the like are used to describe implementations of the present application, it is understood that such terms are merely used with respect to the orientations shown in the drawings. The orientations can be inverted, rotated, or otherwise changed such that the spatial and directional terms apply differently, for example if the structure is flipped 180°: a top side becomes a bottom side; upward becomes downward; a left side becomes a right side; vice versa; and/or the like. Moreover, and for example, vertical may become horizontal when the structure is rotated 90°.

Card skimming devices are used for theft of customer magnetic stripe data and PIN codes. For example, known skimming devices are overlays that are overlaid on the user interfaces of card reader devices (e.g., debit card readers, credit card readers, point of sale (POS) devices, government assistant card readers, etc.) to capture magnetic stripe data and PIN codes from customers. Currently, there is no known solution for combating the growing use of skimming devices.

Certain implementations provide an anti-skimming device that includes a base configured to be mounted to at least one of a support structure or a card reader device. The base includes mounting openings configured to receive mounting hardware for securing the base to the at least one of the support structure or the card reader device. An arm extends outward from the base. The arm includes a flange extending such that a gap is defined between the flange and the base. The gap is configured to receive at least portion of the card reader device therein such that the flange of the arm overlaps a portion of a front side of the card reader device.

Certain implementations provide an anti-skimming bracket that combats card skimming devices by preventing the installation of a skimming device over a card reader device, for example to facilitate preventing the theft of magnetic strip data and/or PIN numbers using a skimming device. For example, certain implementations provide an anti-skimming bracket that includes a flange (e.g., a tab, etc.) that overlaps (e.g., is secured over, extends over, etc.) a front side (e.g., a face, a front face, a side and/or face that includes at least a portion of a user interface of the card reader device, etc.), for example so as to not allow the placement of a skimming device overlaid on the user interface of the card reader device.

Certain implementations provide an anti-skimming bracket that is universal in design and can be used with a variety (e.g., two or more, etc.) of different card reader devices and a variety of different card reader device mounting configurations (e.g., solutions, etc.). For example, certain implementations provide an anti-skimming device that is adjustable to accommodate (e.g., be functional with, be operational with, etc.) a variety of different card reader devices. Moreover, and for example, certain implementations incorporate the anti-skimming bracket into the mounting of the card reader device to a check stand and/or other support structure, for example with an arm (e.g., metal, etc.) that extends from the mounting interface between the card reader device and the check stand and/or other support structure. Certain implementations of the anti-skimming bracket include a visual deterrent. For example, certain implementations of the anti-skimming bracket include (e.g., are painted, powder coated, etc.) a relatively bright color (e.g., a yellow, a green, a red, etc.) that facilitates enabling the customer, the cashier, and/or a potential criminal to recognize the presence of an installed anti-skimming bracket, for example by increasing the likelihood that the customer, cashier, and/or potential criminal visually sees a flange of the anti-skimming bracket overlapping the front side of the card reader device.

Figure 1:
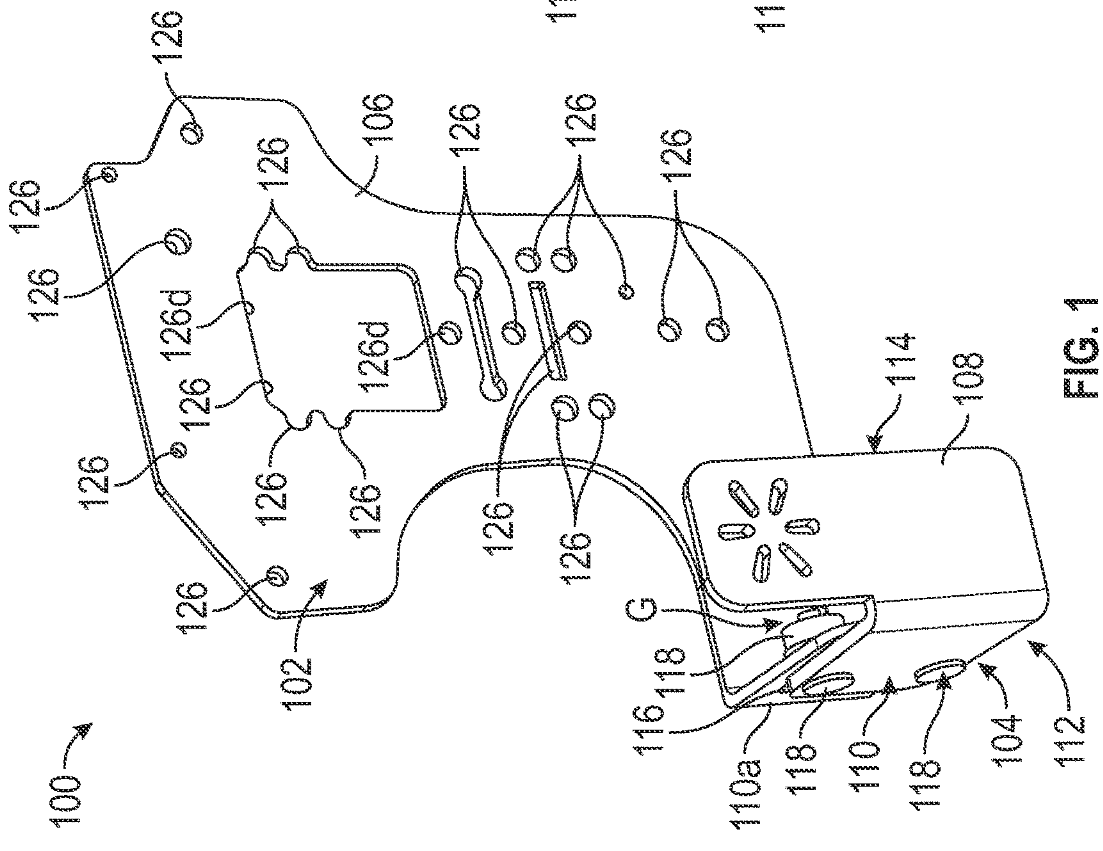
FIG. 1 is an isometric view of an anti-skimming bracket according to an implementation.
Figure 3:
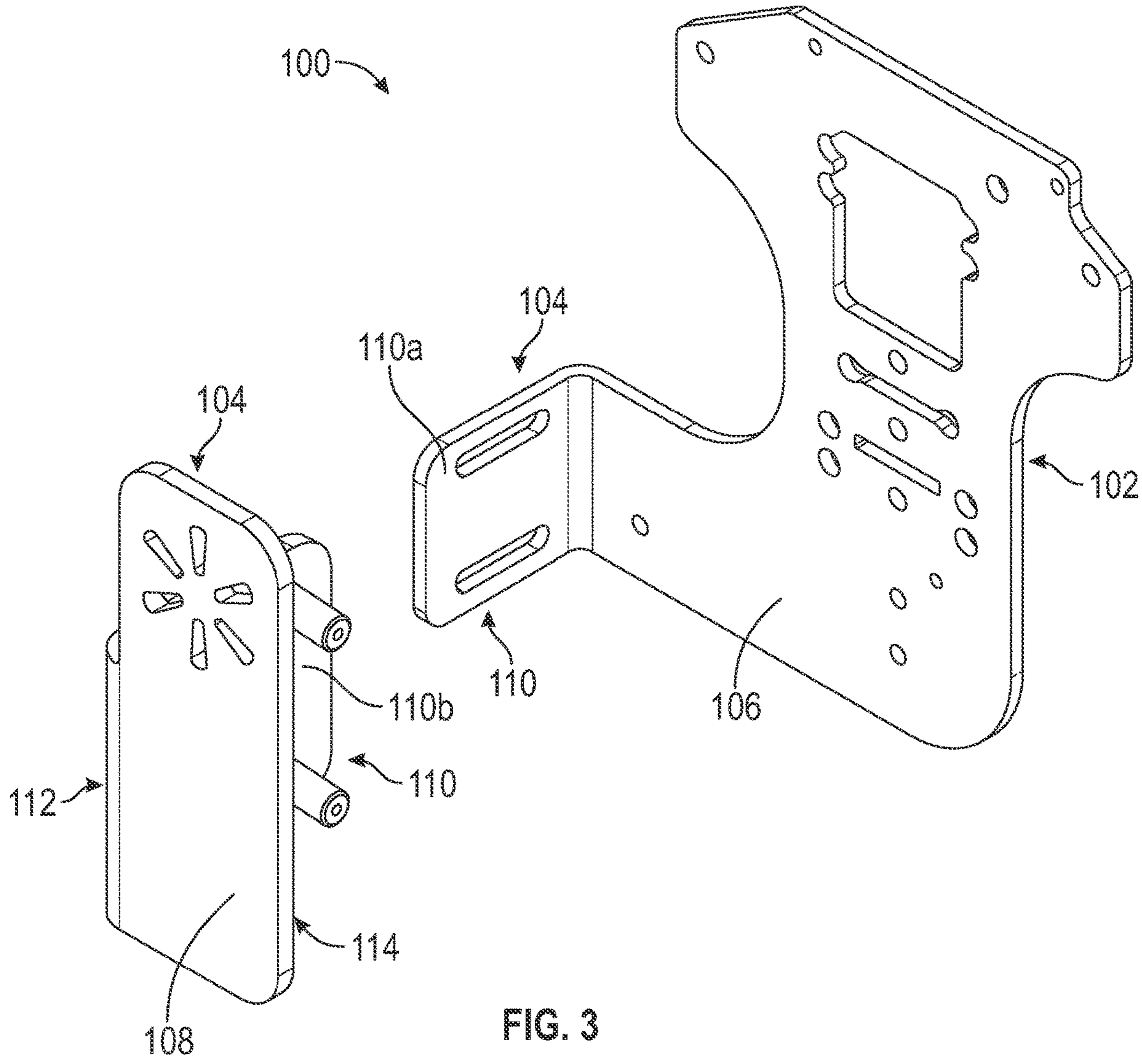
FIG. 3 is an exploded isometric view of the anti-skimming bracket shown in FIGS. 1 and 2.

Referring now to FIGS. 1-3, according to an implementation, an anti-skimming bracket 100 includes a base 102 and an arm 104 extending outward from the base 102. In the exemplary implementation, the base 102 of the anti-skimming bracket 100 includes a mounting plate 106 that is configured to be mounted to a support structure (not shown in FIGS. 1-3; e.g., the support structures 132, 138, 144, and 150 shown in FIGS. 11-14, respectively, etc.) using mounting hardware (not shown in FIGS. 1-3; e.g., the mounting hardware 130 shown in FIGS. 11-17, etc.), as will be described below. As will also be described below, the mounting plate 106 of the exemplary implementation of the base 102 is configured to be mounted to (e.g., installed to, secured to, to hold, to be held by, etc.) a card reader device (not shown in FIGS. 1-3; e.g., the card reader device 200 shown in FIG. 8, the card reader device 300 shown in FIGS. 9 and 16, the card reader device 400 shown in FIGS. 10 and 15, etc.).

The arm 104 includes a flange 108 and a trunk 110. As will be described below, when the anti-skimming bracket 100 is mounted to the card reader device, the flange 108 of the arm 104 overlaps a portion of a front side (not shown in FIGS. 1-3; e.g., the front side 202 shown in FIG. 8, the front side 302 shown in FIG. 9, the front side 402 shown in FIG. 10, etc.) of the card reader device, for example to prevent the installation of a skimming device over a user interface (not shown in FIGS. 1-3, e.g., the user interface 204 shown in FIG. 8, the user interface 304 shown in FIG. 9, the user interface 404 shown in FIG. 10, etc.) of the card reader device.

Figure 4:
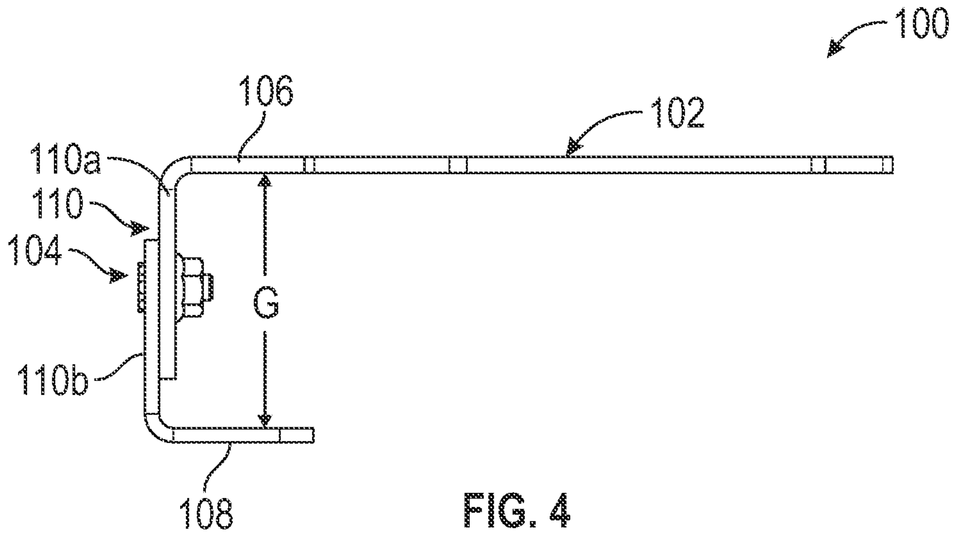
FIG. 4 is a plan view of the anti-skimming bracket shown in FIGS. 1-3.

The trunk 110 of the arm 104 extends outward from the base 102. For example, the trunk 110 extends outward from the mounting plate 106 of the base 102. The trunk 110 extends a length outward from the base 102 to an end portion 112 of the arm 104. In the exemplary implementation, the trunk 110 extends outward from the base 102 at an approximately perpendicular angle (i.e., approximately) 90° relative to the mounting plate 106 of the base 102 (e.g., as best seen in FIG. 4). However, the arm 104 is not limited thereto and may extend at any other angle outward from the mounting plate 106, such as, but not limited to, an oblique angle, etc. The angle of the trunk 110 of the arm 104 relative to the mounting plate 106 may be selected to facilitate enabling the arm 104 to function as described and/or illustrated herein (e.g., to facilitate enabling a gap G to receive at least a portion of the card reader device therein, to facilitate enabling the flange 108 to overlap a portion of the front side of the card reader device, to facilitate enabling the anti-skimming bracket 100 to prevent the installation of a skimming device over the front side of a card reader device, etc.).

The flange 108 extends a length outward from the trunk 110 to an end portion 114 of the flange 108. In the exemplary implementation, the flange 108 extends outward from the end portion 112 of the arm 104, but the flange 108 may additionally or alternatively extend outward from any other location along the length of the trunk 110. The exemplary implementation of the flange 108 extends outward from the trunk 110 at an approximately perpendicular angle (i.e., approximately) 90° relative to the trunk 110, for example as best seen in FIG. 4. However, the flange 108 is not limited thereto and may extend at any other angle outward from the trunk 110, such as, but not limited to, an oblique angle, etc. The angle of the flange 108 relative to the trunk 110 may be selected to facilitate enabling the arm 104 to function as described and/or illustrated herein (e.g., to facilitate enabling the gap G to receive at least a portion of the card reader device therein, to facilitate enabling the flange 108 to overlap a portion of the front side of the card reader device, to facilitate enabling the anti-skimming bracket 100 to prevent the installation of a skimming device over the front side of a card reader device, etc.).

In the exemplary implementation, the trunk 110 of the arm 104 includes discrete segments 110*a* and 110*b* that are connected together to define the length of the trunk 110 (and thus the arm 104). In other words, in the exemplary implementation, the segment 110*b* is detachably mounted to the segment 110*a* such that at least a portion of the arm 104 (i.e., the segment 110*b*) is detachably mounted to the base 102. Although two are shown and described, the trunk 110 (and thus the arm 104) may include any other number of segments. For example, in some other implementations, the trunk 110 (and thus the arm 104) includes more than two (e.g., three, four, etc.) discrete segments that connect together. In still implementations, and for example, the trunk 110 (and thus the arm 104) includes only a single (i.e. one) segment that defines the length of the trunk 110 and the arm 104.

Figure 5:
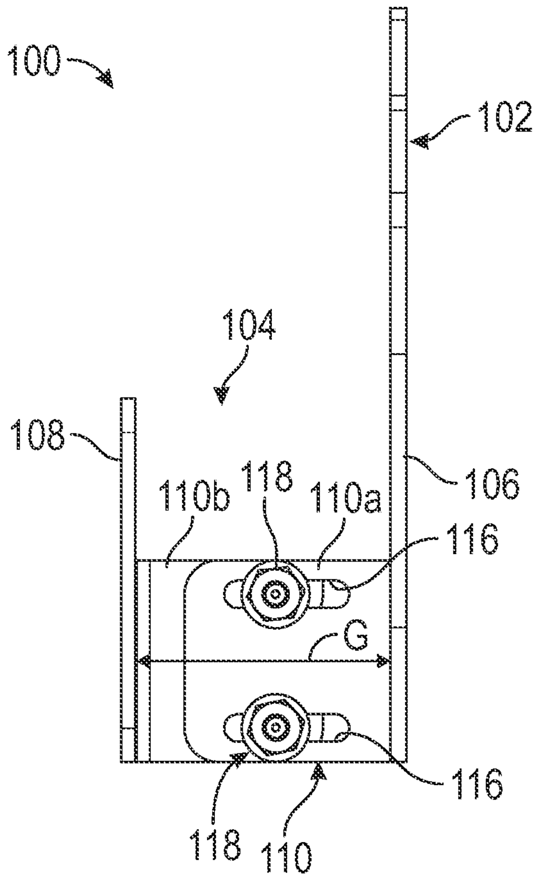
FIG. 5 is a side elevational view of the anti-skimming bracket shown in FIGS. 1-4 illustrating a gap of the anti-skimming bracket according to an implementation.

Referring now to FIGS. 1, 4, and 5, the flange 108 of the arm 104 extends such that a gap G is defined between the flange 108 and the mounting plate 106 of the base 102. As will be described below, the gap G receives at least a portion of the card reader device therein such that the flange 108 overlaps a portion of the front side of the card reader device. The geometry (e.g., size, shape, etc.) of the gap G may be selected to enable the arm 104 to function as described and/or illustrated herein (e.g., to facilitate enabling the gap G to receive at least a portion of the card reader device therein, to facilitate enabling the flange 108 to overlap a portion of the front side of the card reader device, to facilitate enabling the anti-skimming bracket 100 to prevent the installation of a skimming device over the front side of a card reader device, etc.). Selection of the geometry of the trunk 110 of the arm 104, the flange 108 of the arm 104, and/or the gap G may be based on a geometry of the card reader device, for example to minimize the space between the flange 108 and the front side of the card reader device.

Figure 6:
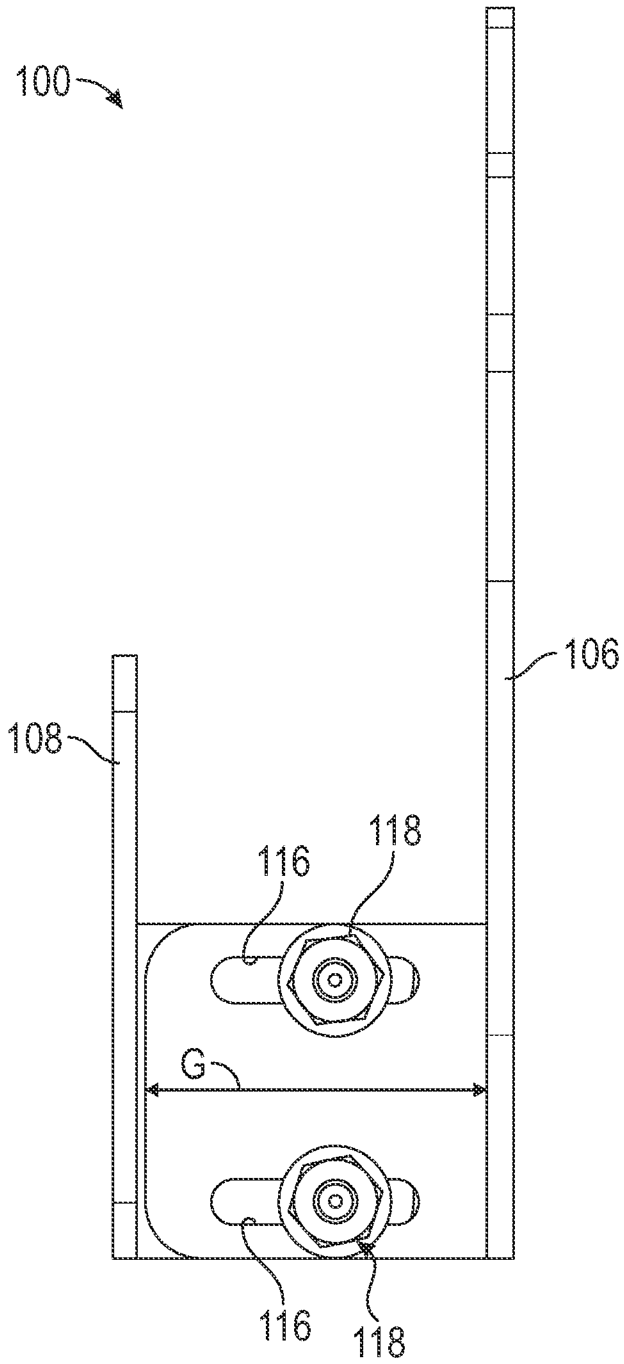
FIG. 6 is a side elevational view of the anti-skimming bracket shown in FIGS. 1-5 illustrating a larger gap of the anti-skimming bracket according to an implementation.

Optionally, a size of the gap G is adjustable, for example to enable the anti-skimming bracket 100 to accommodate (e.g., operate with, function with, etc.) two or more different geometries of card reader devices. For example, the length of the arm 104 (i.e., the length of the trunk 110) can be adjusted to selectively change the size of the gap G. In the exemplary implementation, the segments 110*a* and/or 110*b* of the arm 104 include one or more slots 116 that cooperate to receive hardware 118 that connects the segments 110*a* and 110*b* together. The slots 116 are elongate such that the position of the hardware 118 along the length of the slots 116 can be adjusted to selectively change the length of the trunk 110 (and thus the arm 104). For example, FIGS. 4 and 5 illustrate a first position of the hardware 118 along the length of the slots 116 that provides the gap G with a first size; and FIG. 6 illustrates a second position of the hardware 118 within the slots 116 that provides the gap G with a second size that is smaller than the first size of the gap G shown in FIGS. 4 and 5 (e.g., to accommodate a card reader device having a lesser thickness, etc.).

Although two are shown, each of the segments 110*a* and/or 110*b* may include any other number of the slots 116 (e.g., only a single slot 116, three or more slots 116, etc.). In addition or alternative to the geometry described and/or illustrated herein, the slots 116 may include any other geometry that enables the size of the gap G to be adjusted. Each slot 116 may have any value of length, for example which may be selected to provide a predetermined amount of length adjustment of the arm 104 and/or size adjustment of the gap G. The hardware 118 may include any type of hardware that enables the arm 104 to function as described and/or illustrated herein (e.g., to connect the segments 110*a* and 110*b* together, to enable the size of the gap G to be adjusted, etc.), such as, but not limited to, a fastener, a threaded fastener, a clip, a clamp, a latch, an interlock member, a snap-fit member, a pin, an interference fit member, a stand, a pole, an arm, an extension, and/or the like. In some implementations, the hardware 118 includes a lock nut, a lock washer, a security fastener (e.g., a fastener that requires a non-standard tool to install and/or uninstall, etc.), and/or the like. In addition or alternative to the slots 116 and/or the hardware 118, any other arrangement, means, configuration, structure, system, and/or the like may be used to connect the segments 110*a* and 110*b* together and/or to enable the size of the gap G to be adjusted.

Optionally, an angle of at least a portion of the arm 104 with respect to the base 102 is adjustable, for example to enable the anti-skimming bracket 100 to accommodate (e.g., function with, operate with, etc.) two or more different geometries of card reader devices. For example, the angle of at least a portion of the arm 104 (e.g., the flange 108, the trunk 110, etc.) can be changed relative to the mounting plate 106 of the base 102 to selectively change a shape of the gap G, for example to accommodate different shapes of card reader device (e.g., a card reader device with a sloped surface along the front side thereof, a card reader device without a sloped surface along the front side thereon, etc.) by adjusting the gap G to have a complementary shape that accommodates a particular geometry of a card reader device.

Figure 7:
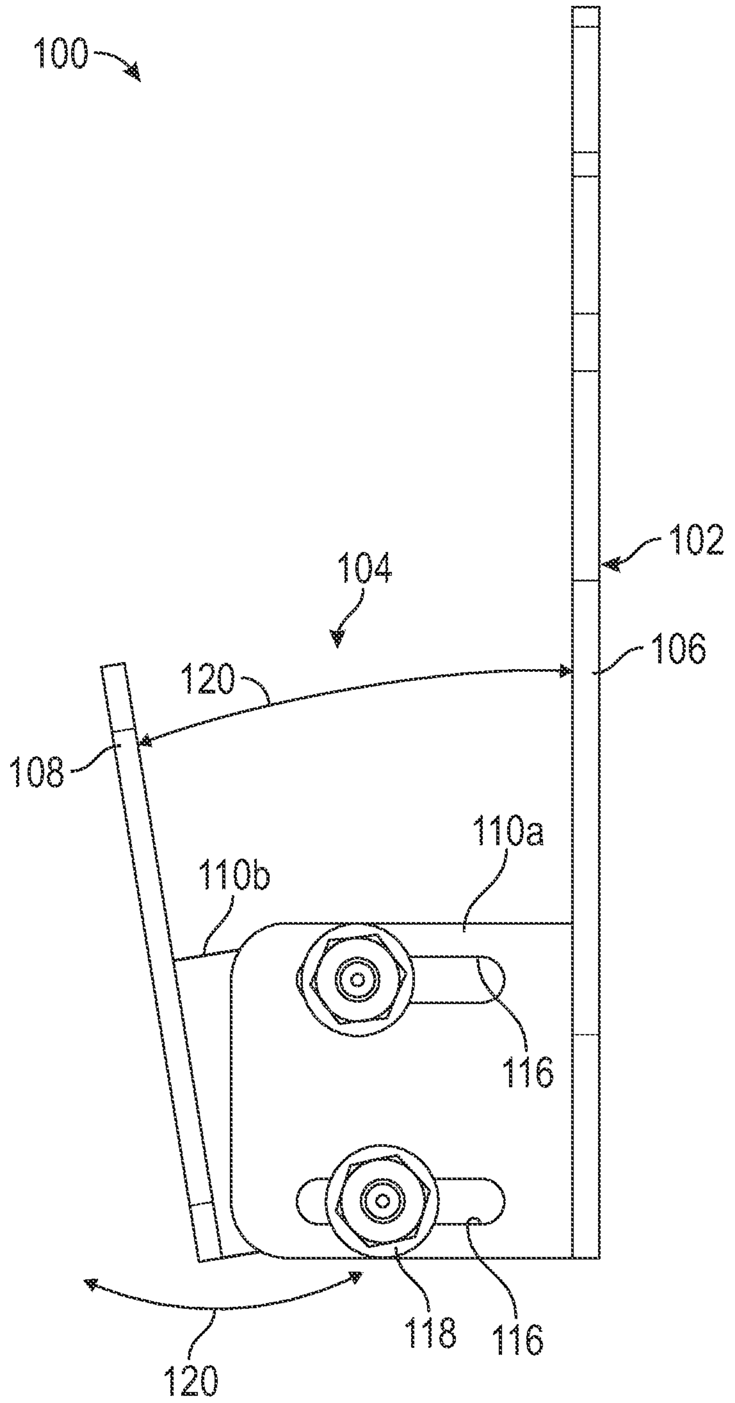
FIG. 7 is a side elevational view of the anti-skimming bracket shown in FIGS. 1-6 illustrating an angular adjustment of a flange of the anti-skimming bracket according to an implementation.

Referring now to FIGS. 5 and 7, in the exemplary implementation, the slots 116 enable adjustment of the angle of the arm 104 relative to the base 102. For example, the segment 110*b* of the trunk 110 can be rotated relative to the segment 110*a* of the trunk 110 to selectively change the angle of the arm 104 relative to the base 102, for example along an arc 120. For example, FIG. 5 illustrates a first angular position of the segment 110*b* relative to the segment 110*a*, wherein the flange 108 of the arm 104 extends approximately parallel with the mounting plate 106 of the base 102. In FIG. 7, for example, the segment 110*b* is rotated relative to the segment 110*a* to a second angular position of the segment 110*b*. As shown in FIG. 7, rotation of the segment 110*b* changes the angle of the flange 108 from the parallel angle shown in FIG. 5 to the oblique angle relative to the mounting plate 106 that is shown in FIG. 7.

In addition or alternative to the geometry described and/or illustrated herein, the slots 116 may include any other geometry that enables the angle of the arm 104 to be adjusted relative to the base 102. Each slot 116 may have any value of length, for example which may be selected to provide a predetermined amount of angle adjustment of the arm 104. In addition or alternative to the slots 116 and/or the hardware 118, any other arrangement, means, configuration, structure, system, and/or the like may be used to enable the angle of the arm 104 to be adjusted relative to the base 102.

In some implementations, the base 102 and/or the arm 104 of the anti-skimming bracket 100 includes a visual deterrent. For example, the mounting plate 106, the trunk 110 of the arm 104, and/or the flange 108 may include (e.g., be painted, powder coated, etc.) a relatively bright color (e.g., a yellow, a green, a red, etc.) that facilitates enabling the customer, the cashier, and/or a potential criminal to recognize the presence of the installed anti-skimming bracket 100, for example by increasing the likelihood that the customer, cashier, and/or potential criminal visually sees the flange 108 overlapping the front side of the card reader device. In some implementations, the flange 108 itself is the visual deterrent (e.g., the geometry, location, position, configuration, arrangement, structure, and/or the like of the flange 108 is selected to increase the likelihood that the customer, cashier, and/or potential criminal visually sees the installed anti-skimming bracket 100, etc.).

Figure 8:
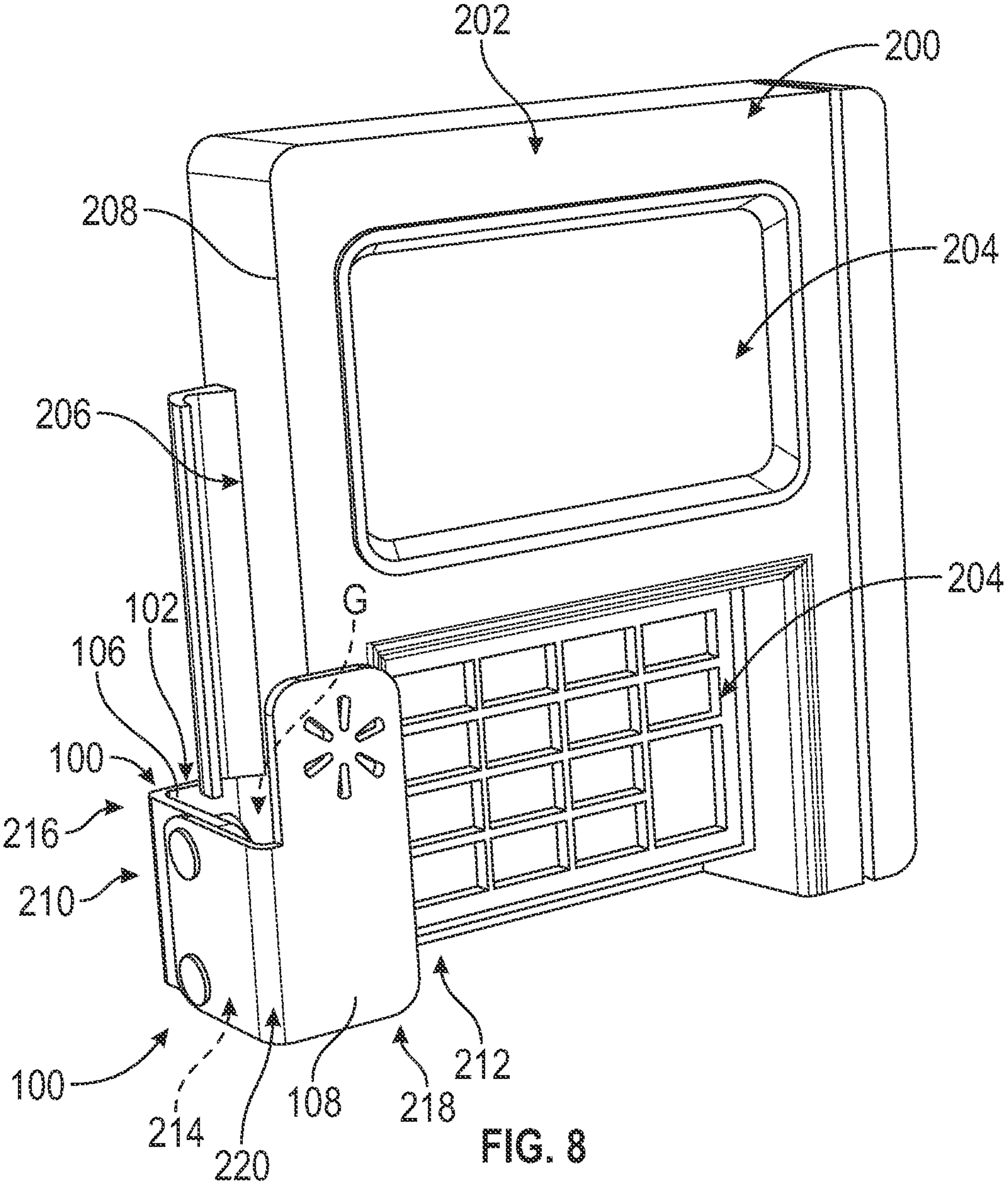
FIG. 8 is an isometric view of the anti-skimming bracket shown in FIGS. 1-7 illustrating the anti-skimming bracket installed to an exemplary card reader device according to an implementation.

Referring now to FIG. 8, the anti-skimming bracket 100 is shown installed to an exemplary card reader device 200. FIG. 8 illustrates the anti-skimming bracket 100 installed to the card reader device 200 such that at least a portion of the card reader device 200 is received within the gap G defined between the base 102 and the flange 108 of the anti-skimming bracket 100. In other words, the gap G receives at least a portion of the card reader device 200 therein when the anti-skimming bracket 100 is installed to the card reader device 200. The gap G may receive any portion(s) or an approximate entirety of the card reader device 200 therein, such as, but not limited to, at least a portion of: an end portion of the card reader device 200; an edge of the card reader device 200; a side of the card reader device 200; a bottom of the card reader device 200; a top of the card reader device 200; a corner of the card reader device 200; and/or the like. In the exemplary implementation shown in FIG. 8, the gap G receives a portion of a side 206 of the card reader device 200 therein. A front side 202 of the card reader device 200 and the side 206 of the card reader device 200 intersect at an edge 208 of the card reader device 200 such that the gap G receives a portion of the edge 208 therein. Portions of an end portion 210, a bottom 212, and a corner 214 of the card reader device 200 are also received within the gap G in the exemplary implementation shown in FIG. 8. In addition or alternative to the exemplary implementation shown in FIG. 8, any other portion of the card reader device 200 may be received within the gap G.

As shown in FIG. 8, when the anti-skimming bracket 100 is installed to the card reader device 200 such that at least a portion of the card reader device 200 is received within the gap G, the flange 108 of the anti-skimming bracket 100 overlaps (e.g., is secured over, extends over, etc.) the front side 202 (e.g., a face, a front face, a side and/or face that includes at least a portion of a user interface 204 of the card reader device 200, etc.), for example so as to prevent the placement, installation, and/or the like of a skimming device (not shown) overlaid on the front side 202 of the card reader device 200 over the user interface 204. The anti-skimming bracket 100 thus combats card skimming devices by preventing the installation of the card skimming device over the user interface 204 of the card reader device 200, for example to facilitate preventing the theft of magnetic strip data and/or PIN codes and/or numbers using the card skimming device.

The flange 108 may overlap any portion(s) of the front side 202 of the card reader device 200, such as, but not limited to, at least a portion of: an end portion of the front side 202 of the card reader device 200; an edge of the front side 202; a side of the front side 202; a bottom of the front side 202; a top of the front side 202; a corner of the front side 202; and/or the like. In the exemplary implementation shown in FIG. 8, the flange 108 overlaps a side of the front side 202 that is at least partially defined by the edge 208 (i.e., such that the flange 108 overlaps the edge 208). In the exemplary implementation of FIG. 8, the flange 108 also overlaps portions of an end portion 216, a bottom 218, and a corner 220 of the front side 202 of the card reader device 200. In addition or alternative to the exemplary implementation shown in FIG. 8, the flange 108 may overlap any other portion of the front side 202 of the card reader device 200 (e.g., another corner of the front side 202, a top of the front side 202, etc.). In implementations wherein an approximate entirety of the card reader device 200 is received within the gap G, the flange 108 may include one or more openings (not shown) that enable access to the user interface 204 of the card reader device 200.

Figure 9:
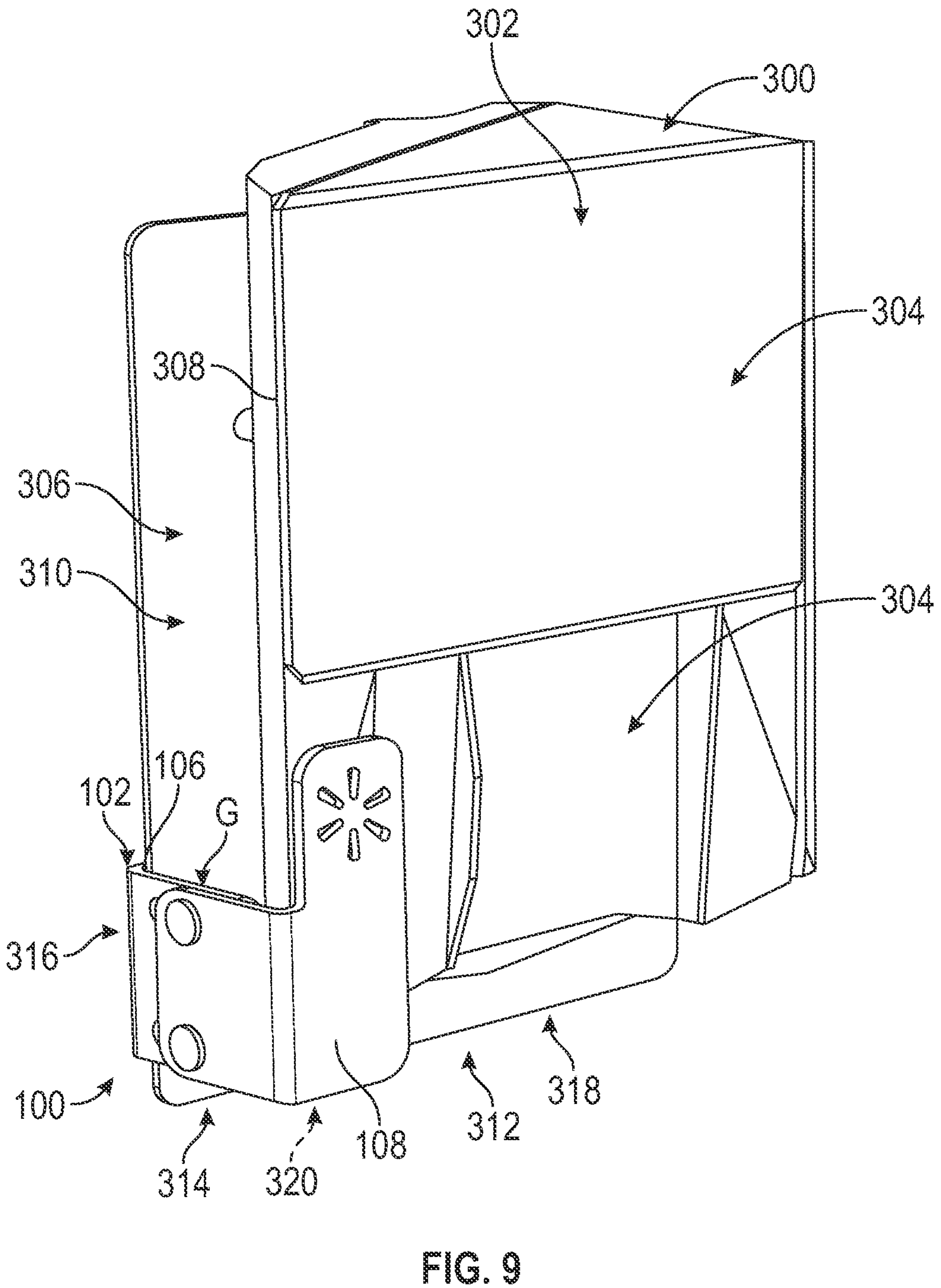
FIG. 9 is an isometric view of the anti-skimming bracket shown in FIGS. 1-7 illustrating the anti-skimming bracket installed to another exemplary card reader device according to an implementation.

FIG. 9 illustrates the anti-skimming bracket 100 installed to another exemplary card reader device 300 that includes a different geometry as compared to the exemplary card reader device 200 shown in FIG. 8. The anti-skimming bracket 100 is installed to the card reader device 300 such that at least a portion of the card reader device 300 is received within the gap G defined between the base 102 and the flange 108 of the anti-skimming bracket 100. The gap G may receive any portion(s) or an approximate entirety of the card reader device 300 therein, such as, but not limited to, at least a portion of: an end portion of the card reader device 300; an edge of the card reader device 300; a side of the card reader device 300; a bottom of the card reader device 300; a top of the card reader device 300; a corner of the card reader device 300; and/or the like. In the exemplary implementation shown in FIG. 9, the gap G receives a portion of a side 306 of the card reader device 300 therein. A front side 302 of the card reader device 300 and the side 306 of the card reader device 300 intersect at an edge 308 of the card reader device 300 such that the gap G receives a portion of the edge 308 therein. Portions of an end portion 310, a bottom 312, and a corner 314 of the card reader device 300 are also received within the gap G in the exemplary implementation shown in FIG. 9. Any other portion of the card reader device 300 may be received within the gap G in addition or alternative to the exemplary implementation shown in FIG. 9. In some implementations, the size of the gap G is adjusted (e.g., made smaller, made larger, etc.) to accommodate the different geometry of the card reader device 300.

When installed to the card reader device 300 as shown in FIG. 9, the flange 108 of the anti-skimming bracket 100 overlaps (e.g., is secured over, extends over, etc.) the front side 302 (e.g., a face, a front face, a side and/or face that includes at least a portion of a user interface 304 of the card reader device 300, etc.), for example so as to prevent the placement, installation, and/or the like of a skimming device (not shown) overlaid on the front side 302 of the card reader device 300 over the user interface 304. The anti-skimming bracket 100 thus combats card skimming devices by preventing the installation of the card skimming device over the user interface 304 of the card reader device 300, for example to facilitate preventing the theft of magnetic strip data and/or PIN codes and/or numbers using the card skimming device.

The flange 108 may overlap any portion(s) of the front side 302 of the card reader device 300, such as, but not limited to, at least a portion of: an end portion of the front side 302 of the card reader device 300; an edge of the front side 302; a side of the front side 302; a bottom of the front side 302; a top of the front side 302; a corner of the front side 302; and/or the like. In the exemplary implementation shown in FIG. 9, the flange 108 overlaps a side of the front side 302 that is at least partially defined by the edge 308 (i.e., such that the flange 108 overlaps the edge 308). As shown in FIG. 9, the flange 108 also overlaps portions of an end portion 316, a bottom 318, and a corner 320 of the front side 302 of the card reader device 300. In addition or alternative to the exemplary implementation shown in FIG. 9, the flange 108 may overlap any other portion of the front side 302 of the card reader device 300 (e.g., another corner of the front side 302, a top of the front side 302, etc.). In implementations wherein an approximate entirety of the card reader device 300 is received within the gap G, the flange 108 may include one or more openings (not shown) that enable access to the user interface 304 of the card reader device 300.

Figure 10:
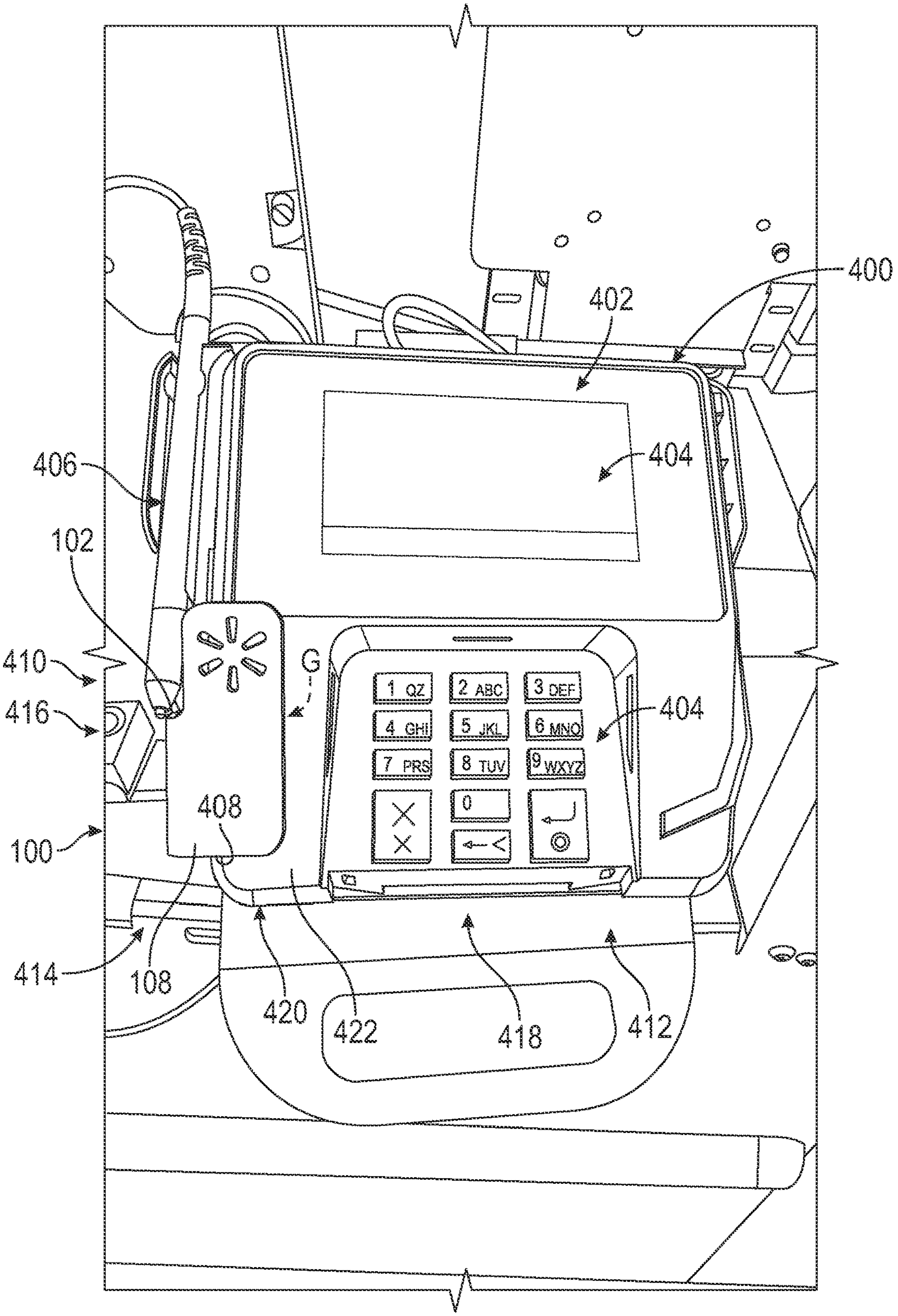
FIG. 10 is an isometric view of the anti-skimming bracket shown in FIGS. 1-7 illustrating the anti-skimming bracket installed to another exemplary card reader device according to an implementation.

FIG. 10 illustrates the anti-skimming bracket 100 installed to another exemplary card reader device 400 that includes a different geometry as compared to the exemplary card reader devices 200 and 300 shown in FIGS. 8 and 9, respectively. The anti-skimming bracket 100 is installed to the card reader device 400 such that at least a portion of the card reader device 400 is received within the gap G defined between the base 102 and the flange 108 of the anti-skimming bracket 100. The gap G may receive any portion(s) or an approximate entirety of the card reader device 400 therein, such as, but not limited to, at least a portion of: an end portion of the card reader device 400; an edge of the card reader device 400; a side of the card reader device 400; a bottom of the card reader device 400; a top of the card reader device 400; a corner of the card reader device 400; and/or the like. In FIG. 10, the gap G receives a portion of a side 406 of the card reader device 400 therein. A front side 402 of the card reader device 400 and the side 406 of the card reader device 400 intersect at an edge 408 of the card reader device 400 such that the gap G receives a portion of the edge 408 therein. Portions of an end portion 410, a bottom 412, and a corner 414 of the card reader device 400 are also received within the gap G in the exemplary implementation shown in FIG. 10. Any other portion of the card reader device 400 may be received within the gap G in addition or alternative to the exemplary implementation shown in FIG. 10. In some implementations, the size of the gap G is adjusted (e.g., made smaller, made larger, etc.) to accommodate the different geometry of the card reader device 400.

FIG. 10 illustrates that when the anti-skimming bracket 100 is installed to the card reader device 400, the flange 108 of the anti-skimming bracket 100 overlaps (e.g., is secured over, extends over, etc.) the front side 402 (e.g., a face, a front face, a side and/or face that includes at least a portion of a user interface 404 of the card reader device 400, etc.), for example so as to prevent the placement, installation, and/or the like of a skimming device (not shown) overlaid on the front side 402 of the card reader device 400 over the user interface 404. The anti-skimming bracket 100 thus combats card skimming devices by preventing the installation of the card skimming device over the user interface 404 of the card reader device 400, for example to facilitate preventing the theft of magnetic strip data and/or PIN codes and/or numbers using the card skimming device.

The flange 108 may overlap any portion(s) of the front side 402 of the card reader device 400, such as, but not limited to, at least a portion of: an end portion of the front side 402 of the card reader device 400; an edge of the front side 402; a side of the front side 402; a bottom of the front side 402; a top of the front side 402; a corner of the front side 402; and/or the like. In the exemplary implementation shown in FIG. 10, the flange 108 overlaps a side of the front side 402 that is at least partially defined by the edge 408 (i.e., such that the flange 108 overlaps the edge 408). FIG. 10 illustrates that the flange 108 also overlaps portions of an end portion 416, a bottom 418, and a corner 420 of the front side 402 of the card reader device 400. In addition or alternative to the exemplary implementation shown in FIG. 10, the flange 108 may overlap any other portion of the front side 402 of the card reader device 400 (e.g., another corner of the front side 402, a top of the front side 402, etc.). In implementations wherein an approximate entirety of the card reader device 400 is received within the gap G, the flange 108 may include one or more openings (not shown) that enable access to the user interface 404 of the card reader device 400.

In the exemplary implementation shown in FIG. 10, the angle of the flange 108 relative to the base 102 has been adjusted to the oblique angle shown in FIG. 7 to accommodate a sloped surface 422 of the front side 402 of the card reader device (e.g., to minimize the space between the flange 108 and the sloped surface 422, etc.). In other words, the angle of the flange 108 has been adjusted to the oblique angle shown in FIGS. 7 and 10 to adjust the gap G to have a complementary shape with the sloped surface 422 of the card reader device.

Referring again to FIG. 1, as briefly described above, the mounting plate 106 of the base 102 of the anti-skimming bracket 100 is configured to be mounted to a support structure (not shown in FIG. 1) and/or a card reader device (not shown in FIG. 1) the using mounting hardware (not shown in FIG. 1). In the exemplary implementation, the mounting plate 106 is configured such that the anti-skimming bracket 100 is universal in design and can be used with a variety (e.g., two or more, etc.) of different support structures and a variety of different support structure mounting configurations (e.g., solutions, etc.).

For example, the mounting plate 106 of the base 102 includes mounting openings 126 that are configured to receive the mounting hardware for securing the base 102 to the support structure and/or the card reader device using the mounting hardware. The mounting openings 126 are arranged to include at least two different patterns that are each configured to accommodate a corresponding different mounting configuration of the support structure. For example, referring now to FIG. 11, the mounting plate 106 includes a pattern 128 of mounting openings **126*a* that are configured to receive mounting hardware 130 therein to mount the base 102 of the anti-skimming bracket 100 to a support structure 132 using the mounting hardware 130. The pattern 128 of the mounting openings 126*a* is arranged to be complementary with a pattern of a mounting configuration 134 of the support structure 132, such that cooperation between the mounting openings 126*a* and the mounting hardware 130 enables the anti-skimming bracket 100 to be secured to the support structure 132. The pattern 128 may be referred to herein as a "first" pattern and/or a "second" pattern. The mounting configuration 134** may be referred to herein as a "first" and/or a "second" mounting configuration.

The mounting hardware 130 may include any type of hardware that enables the anti-skimming bracket 100 to be securely mounted to the support structure 132, such as, but not limited to, a fastener, a threaded fastener, a clip, a clamp, a latch, an interlock member, a snap-fit member, a pin, an interference fit member, a stand, a pole, an arm, an extension, and/or the like. In the exemplary implementation of FIG. 11, the mounting hardware 130 used to mount the anti-skimming bracket 100 to the support structure 132 includes threaded fasteners. In some implementations, the mounting hardware 130 used to mount the anti-skimming bracket 100 to the support structure 132 includes a lock nut, a lock washer, a security fastener (e.g., a fastener that requires a non-standard tool to install and/or uninstall, etc.), and/or the like.

Although two are shown in the illustrated implementation, the pattern 128 may include any number of the mounting openings 126*a* of the mounting plate 106 and the pattern 128 may include any number of the mounting hardware 130. In the exemplary implementation, the support structure 132 includes a stand 132*a* and a pole 132*b*. However, the support structure 132 may additionally or alternatively include any other structure, geometry, and/or the like, such as, but not limited to, an arm, an extension, a table, a counter, a countertop, a tabletop, a floor, a wall, a ceiling, a booth, and/or the like.

Figure 12:
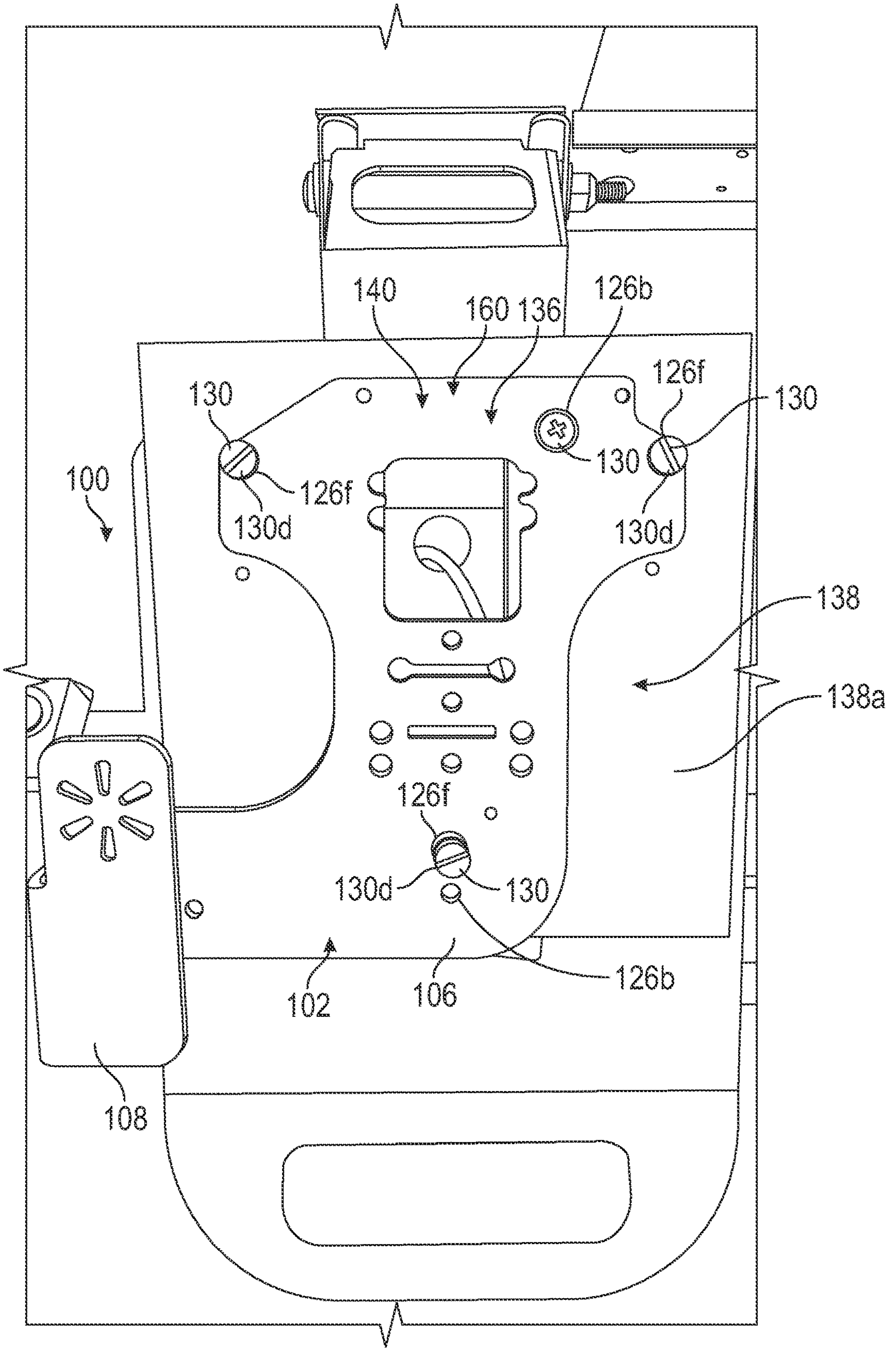
FIG. 12 is an isometric view of the anti-skimming bracket shown in FIGS. 1-7 illustrating the anti-skimming bracket mounted to another exemplary support structure according to an implementation.

In another example shown in FIG. 12, the mounting plate 106 includes a pattern 136 of mounting openings 126*b* that are configured to receive mounting hardware 130 therein to mount the base 102 of the anti-skimming bracket 100 to a support structure 138 using the mounting hardware 130. The pattern 136 of the mounting openings 126*b* is arranged to be complementary with a pattern of a mounting configuration 140 of the support structure 138, such that cooperation between the mounting openings 126*b* and the mounting hardware 130 enables the anti-skimming bracket 100 to be secured to the support structure 138. The pattern 136 may be referred to herein as a "first" pattern and/or a "second" pattern. The mounting configuration 140 may be referred to herein as a "first" and/or a "second" mounting configuration.

The mounting hardware 130 may include any type of hardware that enables the anti-skimming bracket 100 to be securely mounted to the support structure 138, such as, but not limited to, a fastener, a threaded fastener (e.g., as is shown in the exemplary implementation of FIG. 12, etc.), a clip, a clamp, a latch, an interlock member, a snap-fit member, a pin, an interference fit member, a stand, a pole, an arm, an extension, and/or the like. In some implementations, the mounting hardware 130 used to mount the anti-skimming bracket 100 to the support structure 138 includes a lock nut, a lock washer, a security fastener (e.g., a fastener that requires a non-standard tool to install and/or uninstall, etc.), and/or the like.

Although two are shown in the illustrated implementation, the pattern 136 may include any number of the mounting openings 126*b* of the mounting plate 106 and the pattern 136 may include any number of the mounting hardware 130. In the exemplary implementation, the support structure 138 includes a check stand 138*a*. However, the support structure 138 may additionally or alternatively include any other structure, geometry, and/or the like, such as, but not limited to, a pole, another type of stand, an arm, an extension, a table, a counter, a countertop, a tabletop, a floor, a wall, a ceiling, a booth, and/or the like.

Figure 13:
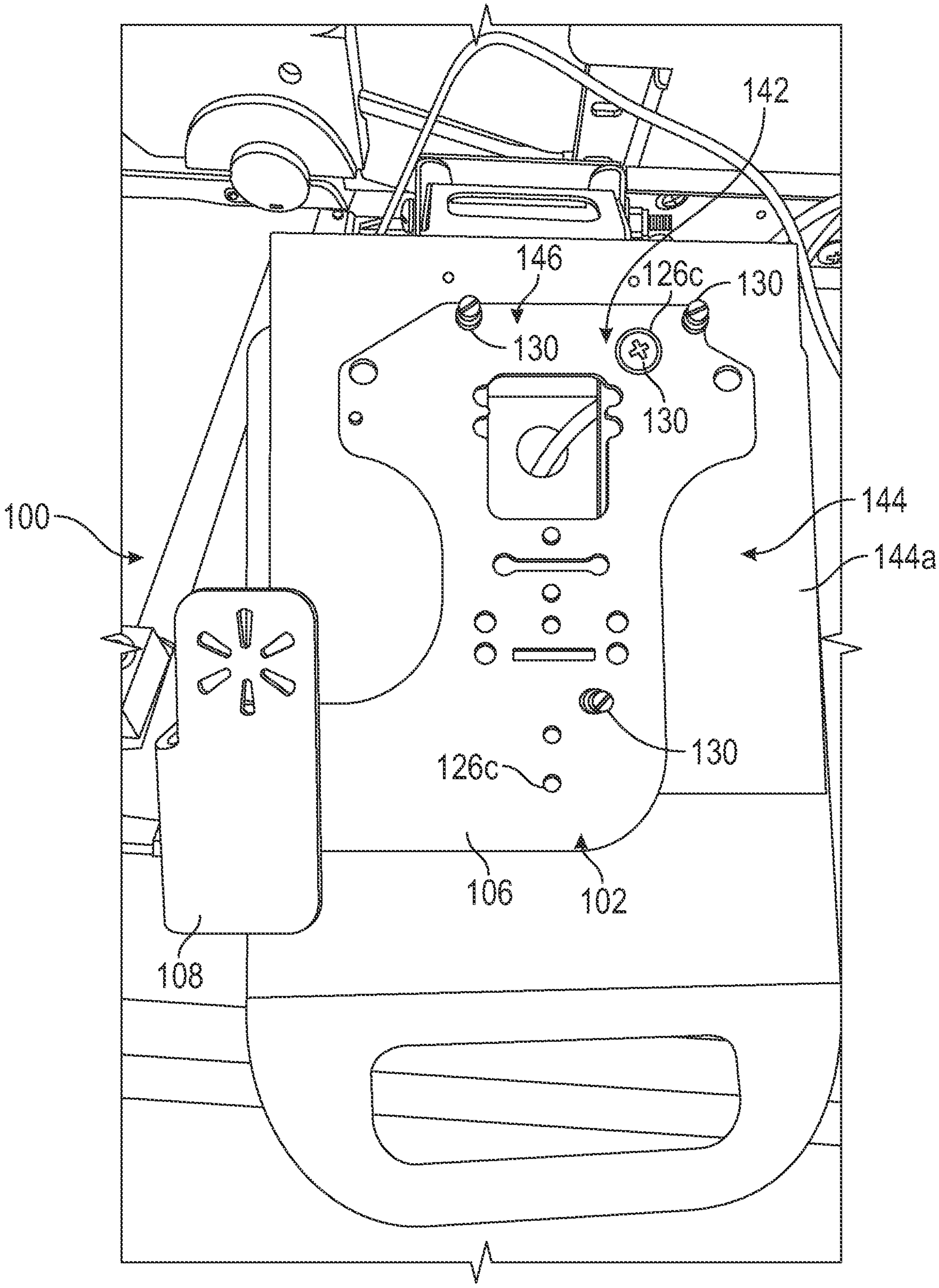
FIG. 13 is an isometric view of the anti-skimming bracket shown in FIGS. 1-7 illustrating the anti-skimming bracket mounted to another exemplary support structure according to an implementation.

FIG. 13 illustrates another example wherein the mounting plate 106 includes a pattern 142 of mounting openings 126*c* that are configured to receive mounting hardware 130 therein to mount the base 102 of the anti-skimming bracket 100 to a support structure 144 using the mounting hardware 130. The pattern 142 of the mounting openings 126*c* is arranged to be complementary with a pattern of a mounting configuration 146 of the support structure 144, such that cooperation between the mounting openings 126*c* and the mounting hardware 130 enables the anti-skimming bracket 100 to be secured to the support structure 144. The pattern 142 may be referred to herein as a "first" pattern and/or a "second" pattern. The mounting configuration 146 may be referred to herein as a "first" and/or a "second" mounting configuration.

The mounting hardware 130 may include any type of hardware that enables the anti-skimming bracket 100 to be securely mounted to the support structure 144, such as, but not limited to, a fastener, a threaded fastener (e.g., as is shown in the exemplary implementation of FIG. 13, etc.), a clip, a clamp, a latch, an interlock member, a snap-fit member, a pin, an interference fit member, a stand, a pole, an arm, an extension, and/or the like. In some implementations, the mounting hardware 130 used to mount the anti-skimming bracket 100 to the support structure 144 includes a lock nut, a lock washer, a security fastener (e.g., a fastener that requires a non-standard tool to install and/or uninstall, etc.), and/or the like.

Figure 17:
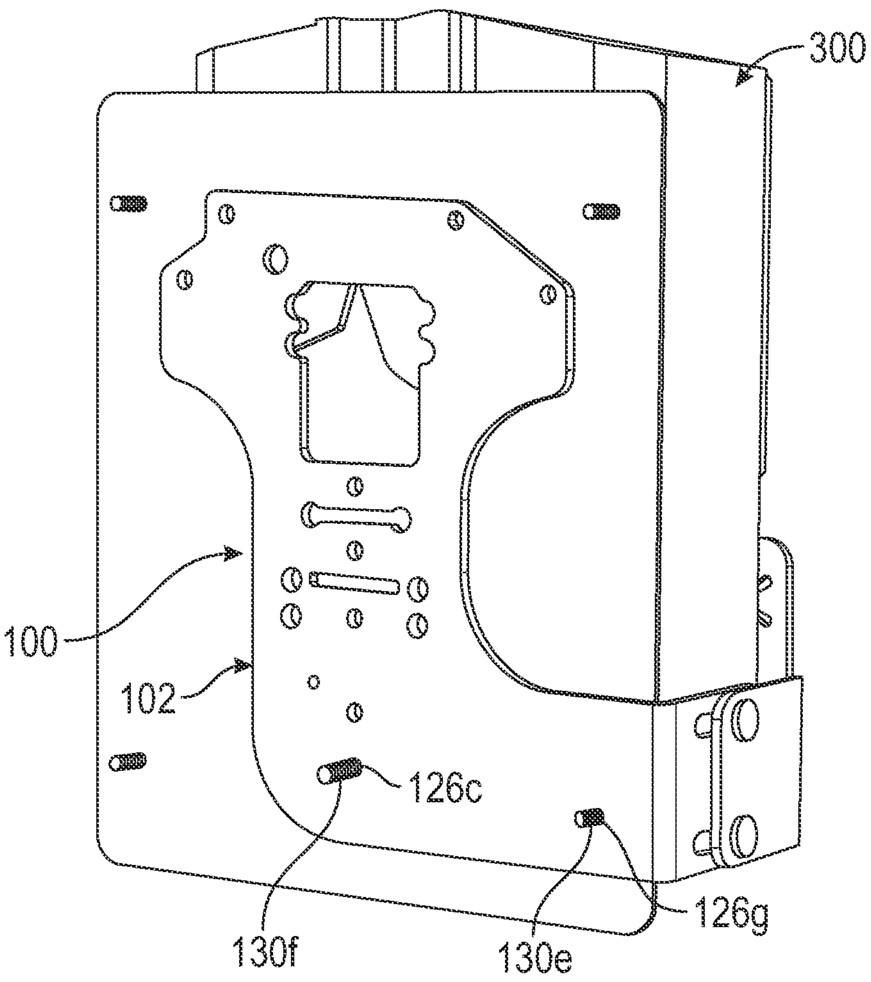
FIG. 17 is an isometric view of the anti-skimming bracket shown in FIGS. 1-7 illustrating the anti-skimming bracket installed to the exemplary card reader device shown in FIG. 9 according to an implementation.

Although two are shown in the illustrated implementation, the pattern 142 may include any number of the mounting openings 126*c* of the mounting plate 106 and the pattern 142 may include any number of the mounting hardware 130 (the mounting hardware 130*f* for one of the mounting openings 126*c* is not shown in FIG. 13, but is illustrated extending through the mounting opening 126*c* in FIG. 17). In the exemplary implementation, the support structure 144 includes a check stand 144*a*. However, the support structure 144 may additionally or alternatively include any other structure, geometry, and/or the like, such as, but not limited to, a pole, another type of stand, an arm, an extension, a table, a counter, a countertop, a tabletop, a floor, a wall, a ceiling, a booth, and/or the like.

Figure 14:
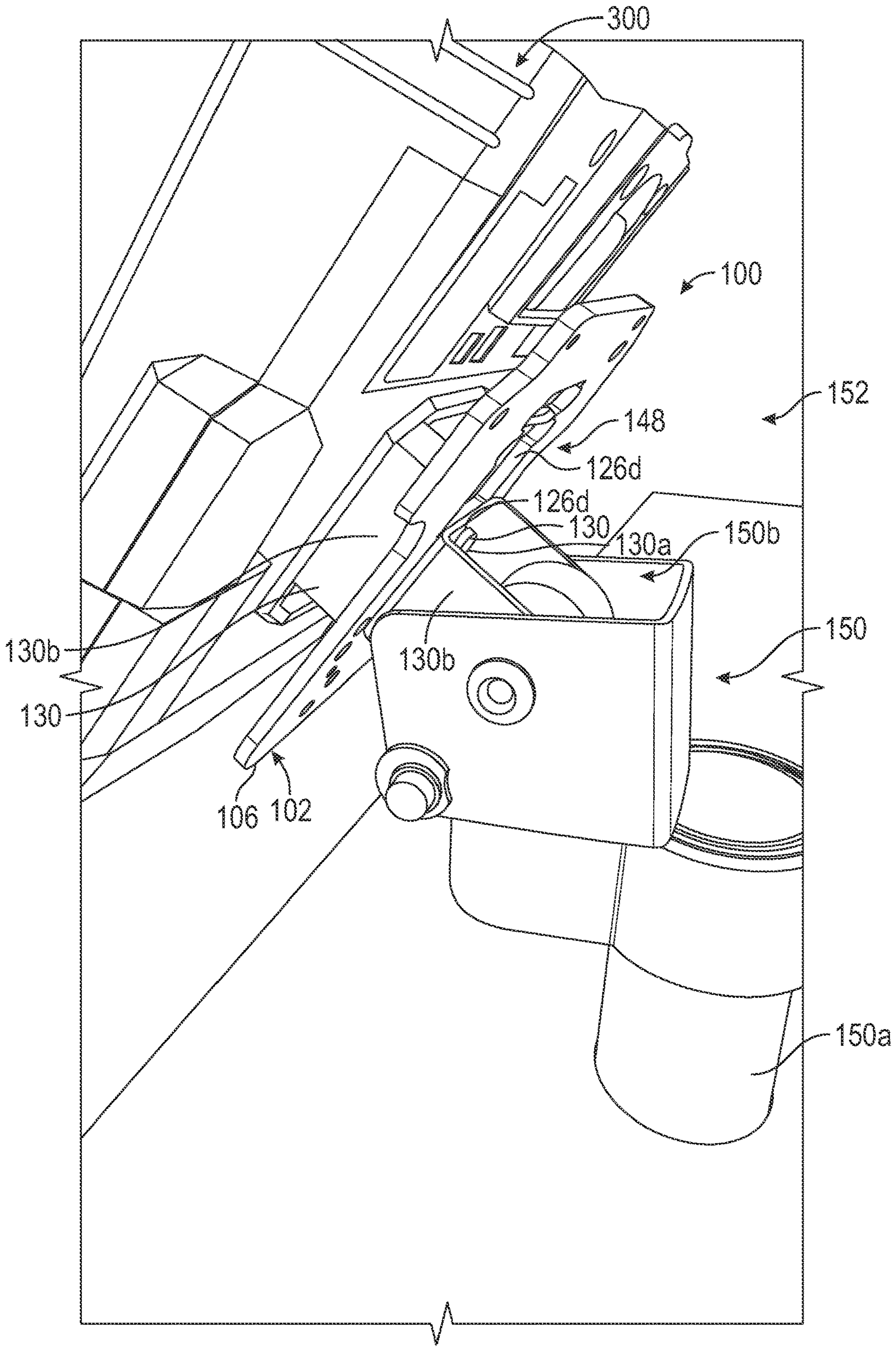
FIG. 14 is an isometric view of the anti-skimming bracket shown in FIGS. 1-7 illustrating the anti-skimming bracket mounted to the card reader device shown in FIG. 9 and another exemplary support structure according to an implementation.

Referring now to FIGS. 1 and 14, the mounting plate 106 includes a pattern 148 of mounting openings 126*d* that are configured to receive mounting hardware 130 therein to mount the base 102 of the anti-skimming bracket 100 to a support structure 150 (not shown in FIG. 1) using the mounting hardware 130. The pattern 148 of the mounting openings 126*d* is arranged to be complementary with a pattern of a mounting configuration 152 of the support structure 150, such that cooperation between the mounting openings 126*d* and the mounting hardware 130 enables the anti-skimming bracket 100 to be secured to the support structure 150. The pattern 148 may be referred to herein as a "first" pattern and/or a "second" pattern. The mounting configuration 152 may be referred to herein as a "first" and/or a "second" mounting configuration.

The mounting hardware 130 may include any type of hardware that enables the anti-skimming bracket 100 to be securely mounted to the support structure 150, such as, but not limited to, a fastener, a threaded fastener, a clip, a clamp, a latch, an interlock member, a snap-fit member, a pin, an interference fit member, a stand, a pole, an arm, an extension, and/or the like. In the exemplary implementation, the mounting hardware 130 used to mount the anti-skimming bracket 100 to the support structure 150 includes a threaded fastener 130*a* and a structure 130*b* that may be consider a pole, an arm, an extension, and/or the like that is received through a mounting opening 126*d* of the mounting plate 106. In some implementations, the mounting hardware 130 used to mount the anti-skimming bracket 100 to the support structure 150 includes a lock nut, a lock washer, a security fastener (e.g., a fastener that requires a non-standard tool to install and/or uninstall, etc.), and/or the like.

Although two are shown in the illustrated implementation, the pattern 148 may include any number of the mounting openings 126*d* of the mounting plate 106 and the pattern 148 may include any number of the mounting hardware 130. In the exemplary implementation, the support structure 150 includes a pole 150*a* and an arm 150*b* extending from the pole 150*a*. However, the support structure 150 may additionally or alternatively include any other structure, geometry, and/or the like, such as, but not limited to, a stand, an extension, a table, a counter, a countertop, a tabletop, a floor, a wall, a ceiling, a booth, and/or the like.

As shown in FIG. 14, the base 102 of the anti-skimming bracket 100 is mounted to the support structure 150 and the card reader device 300 such that the base 102 extends between the support structure 150 and the card reader device 300.

Although four examples are shown in FIGS. 11-14, the mounting plate 106 may include any number of patterns for accommodating any number of corresponding mounting configurations and support structures. Moreover, any mounting openings 126 included in the mounting plate 106 that are not labeled and/or shown as being utilized by any of the exemplary patterns 128, 136, 142, and/or 148 may be used in other implementations for other mounting configurations not shown or described herein. One or more additional or alternative mounting openings 126 may be included within the mounting plate 106 in other implementations, for example: to accommodate a mounting configuration not shown herein; to accommodate the exemplary mounting configuration 134, 140, 146, and/or 152; and/or the like.

As briefly described above, the mounting plate 106 of the base 102 of the anti-skimming bracket 100 is configured to be mounted to a card reader device using mounting hardware 130. In the exemplary implementation, the mounting plate 106 is configured such that the anti-skimming bracket 100 is universal in design and can be used with a variety (e.g., two or more, etc.) of different card reader devices and a variety of different card reader device mounting configurations (e.g., solutions, etc.).

For example, in some implementations, the mounting hardware 130 includes interlock members that are configured to be held by corresponding mounting openings 126 and be releasably interlocked with complementary keyholes of a card reader device. The mounting openings 126 and the interlock members are arranged to include at least two different patterns that are each configured to accommodate a corresponding different mounting configuration of the card reader device.

Figure 11:
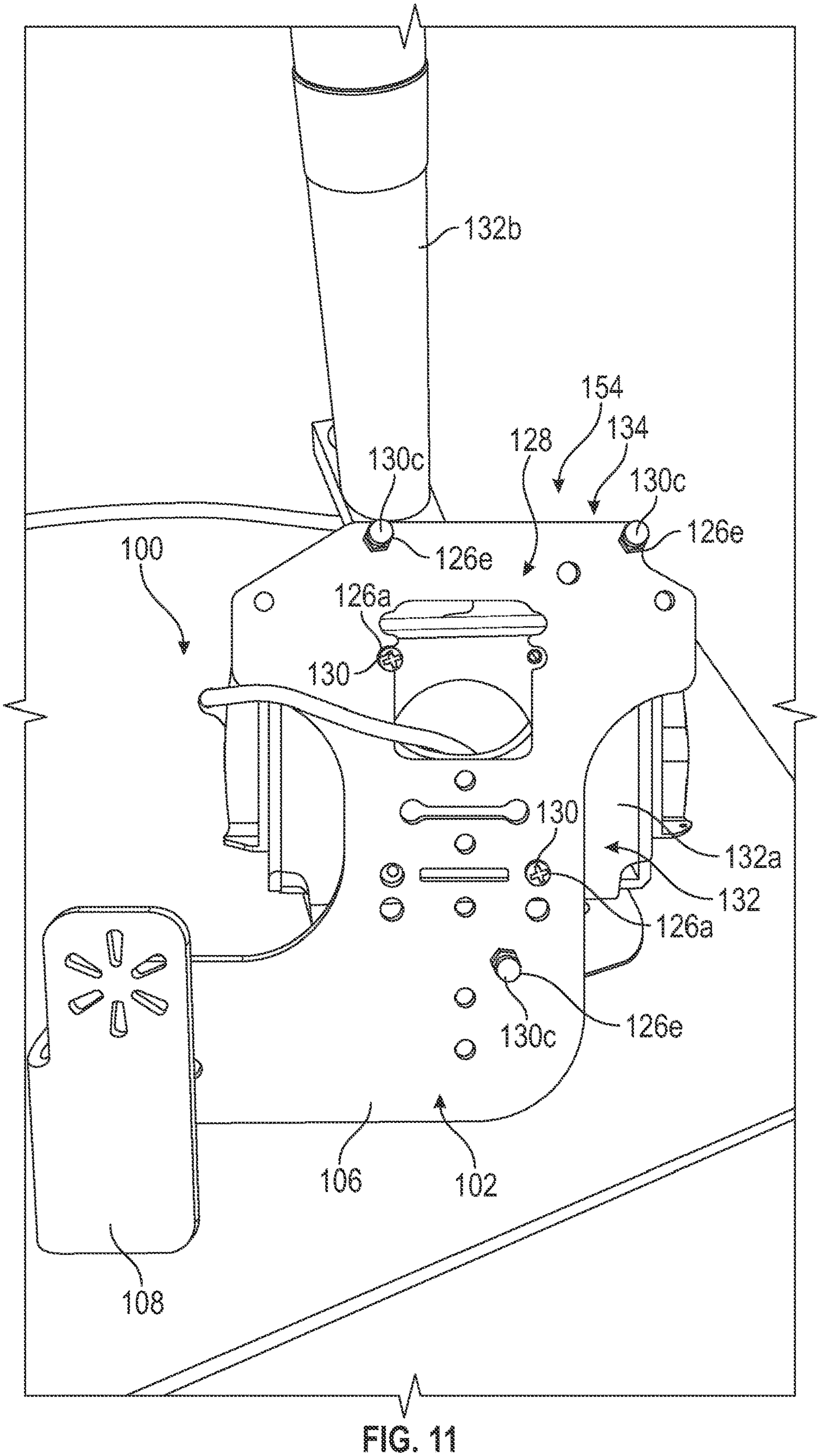
FIG. 11 is an isometric view of the anti-skimming bracket shown in FIGS. 1-7 illustrating the anti-skimming bracket mounted to an exemplary support structure according to an implementation.
Figure 15:
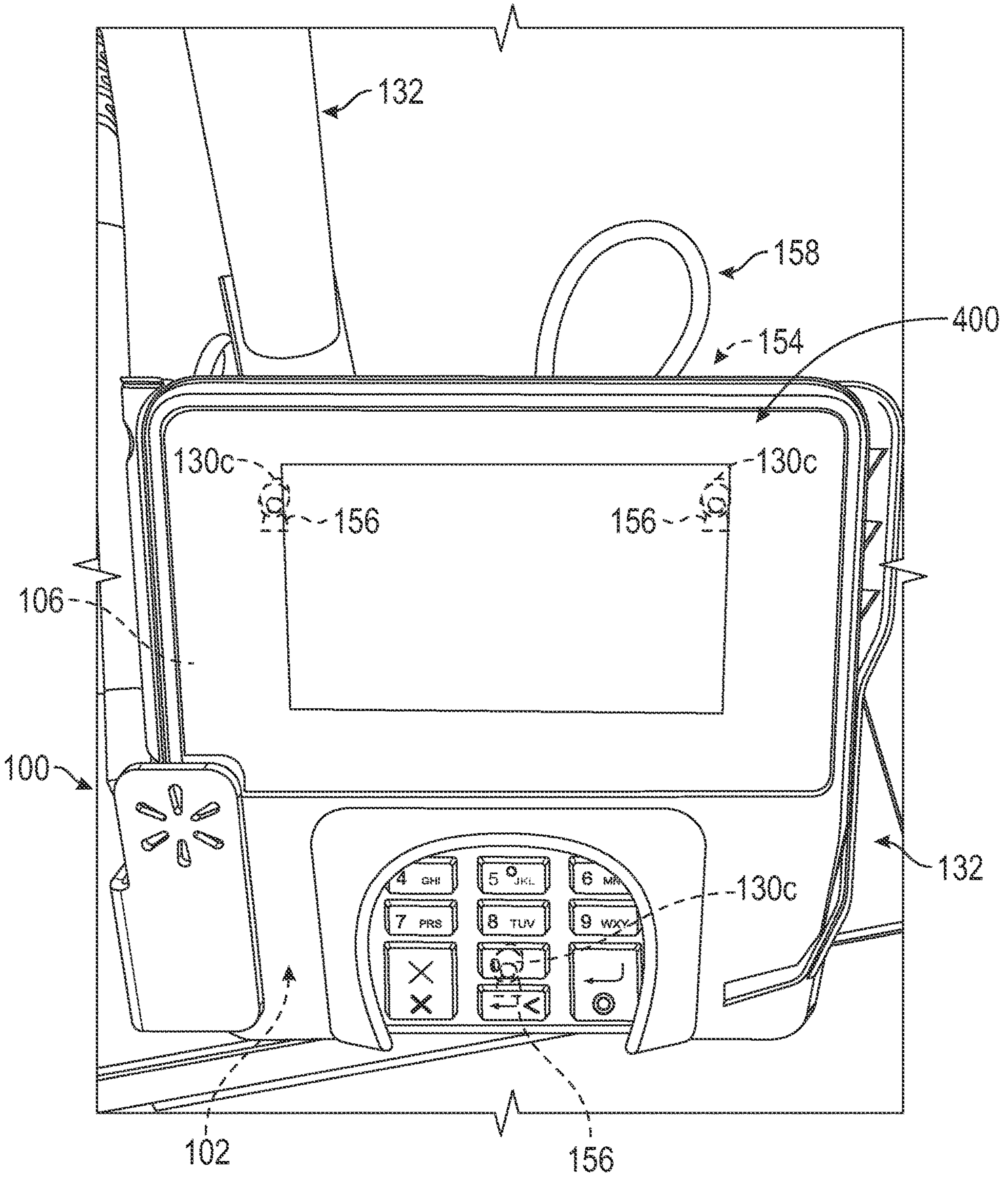
FIG. 15 is an isometric view of the anti-skimming bracket shown in FIGS. 1-7 illustrating the anti-skimming bracket installed to the exemplary card reader device shown in FIG. 10 and the exemplary support structure shown in FIG. 11 according to an implementation.

For example, referring now to FIGS. 11 and 15, the mounting plate 106 includes a pattern 154 of mounting openings 126*e* that are configured to receive interlock members 130*c* of the mounting hardware 130 therein. Each of the interlock members 130*c* is received within and interlocked with a corresponding keyhole 156 of the card reader device 400 to mount the card reader device 400 to the support structure 132 and the anti-skimming bracket 100 using the interlock members 130*c*. The pattern 154 of the mounting openings 126*e* is arranged to be complementary with a pattern of a mounting configuration 158 of the keyholes 156 of the card reader device 400. The pattern 154 may be referred to herein as a "first" pattern and/or a "second" pattern. The mounting configuration 158 may be referred to herein as a "first" and/or a "second" mounting configuration. Although three are shown in the illustrated implementation, the pattern 154 may include any number of the mounting openings 126*e* of the mounting plate 106 and the pattern 154 may include any number of the interlock members 130*c*.

As shown in FIG. 15, the base 102 of the anti-skimming bracket 100 is mounted to the support structure 132 and the card reader device 400 such that the base 102 extends between the support structure 132 and the card reader device 400.

Figure 16:
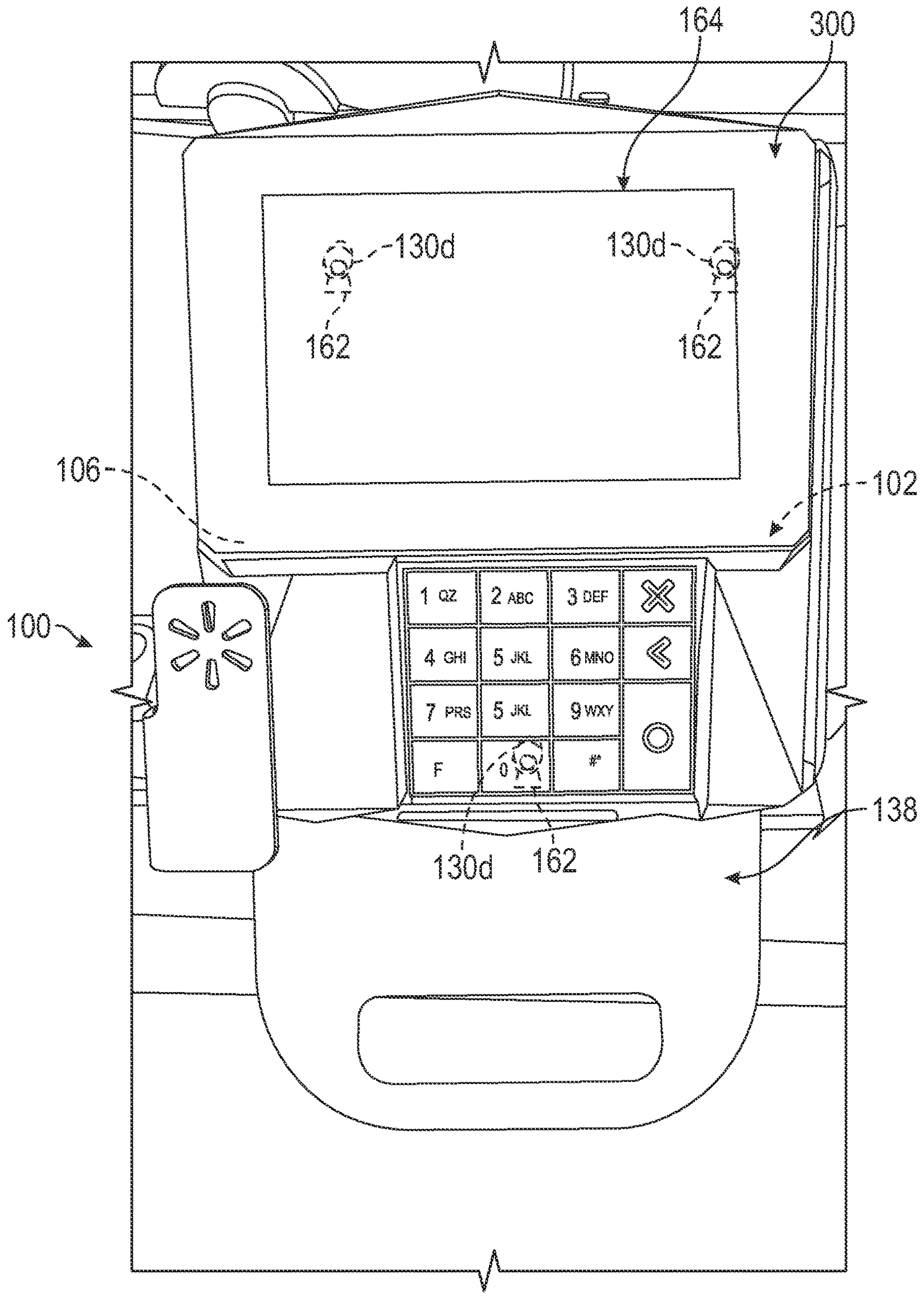
FIG. 16 is an isometric view of the anti-skimming bracket shown in FIGS. 1-7 illustrating the anti-skimming bracket installed to the exemplary card reader device shown in FIG. 9 and the exemplary support structure shown in FIG. 12 according to an implementation.

Another example is shown in FIGS. 12 and 16 wherein the mounting plate 106 includes a pattern 160 of mounting openings 126*f* that are configured to receive interlock members 130*d* of the mounting hardware 130 therein. Each of the interlock members 130*d* is received within and interlocked with a corresponding keyhole 162 of the card reader device 300 to mount the card reader device 300 to the support structure 138 and the anti-skimming bracket 100 using the interlock members 130*d*. The pattern 160 of the mounting openings 126*f* is arranged to be complementary with a pattern of a mounting configuration 164 of the keyholes 162 of the card reader device 300. The pattern 160 may be referred to herein as a "first" pattern and/or a "second" pattern. The mounting configuration 164 may be referred to herein as a "first" and/or a "second" mounting configuration. Although three are shown in the illustrated implementation, the pattern 160 may include any number of the mounting openings 126*f* of the mounting plate 106 and the pattern 160 may include any number of the interlock members 130*d*.

As shown in FIG. 16, the base 102 of the anti-skimming bracket 100 is mounted to the support structure 138 and the card reader device 300 such that the base 102 extends between the support structure 138 and the card reader device 300.

In some implementations, the mounting hardware 130 includes one or more fasteners and/or other hardware that releasably holds the card reader device in an interlocked position with the base 102 of the anti-skimming bracket 100. For example, referring now to FIG. 17, in some implementations the mounting openings 126 include one or more mounting openings 126*g* that receive one or more fasteners 130*e* of the mounting hardware 130 to releasably hold the card reader device (e.g., the card reader device 300, etc.) in an interlocked position with the base 102 of the anti-skimming bracket 100. For example, the fastener(s) 130*e* is configured to hold the interlock members (e.g., the interlock members 130*c* and/or 130*d*, etc.) of the mounting hardware 130 as interlocked within the corresponding keyholes (e.g., the keyholes 156 and/or 162, etc.) of the corresponding card reader device. In some implementations, the fasteners 130*e* of the mounting hardware 130 include a lock nut, a lock washer, a security fastener (e.g., a fastener that requires a non-standard tool to install and/or uninstall, etc.), and/or the like. The fasteners 130*e* may, for example, provide a security feature that prevents an individual (e.g., a potential criminal, etc.) from uninstalling the card reader device from the anti-skimming bracket 100. Moreover, and for example, releasably holding the card reader device as interlocked with the anti-skimming bracket 100 using the fastener 130*e* may enable the card reader device to be removed from the support structure and the anti-skimming bracket 100 relatively easily and relatively quickly, for example for maintenance, replacement, and/or the like.

In addition or alternative to the fastener 130*e*, the mounting hardware 130*f* that is shown extending through the mounting opening 126*c* in FIG. 17 may releasably hold the card reader device (e.g., the card reader device 300, etc.) in an interlocked position with the base 102 of the anti-skimming bracket 100 (in addition or alternative to being used to mount the anti-skimming bracket 100 to the support structure, e.g., the support structure 144 shown in FIG. 13, etc.). For example, in the exemplary implementation of FIG. 17, the mounting hardware **130*f* is configured to extend into a corresponding keyhole 162 (shown in FIG. 16) of the card reader device 300 to hold the interlock members 130*d* within the keyholes 162 (e.g., provide an obstruction that prevents the interlock member 130*d* from being released from the keyhole 162, etc.) of the card reader device 300. In some implementations, the mounting hardware 130*f* includes a lock nut, a lock washer, a security fastener (e.g., a fastener that requires a non-standard tool to install and/or uninstall, etc.), and/or the like. The mounting hardware 130*f* may, for example, provide a security feature that prevents an individual (e.g., a potential criminal, etc.) from uninstalling the card reader device from the anti-skimming bracket 100. Moreover, and for example, releasably holding the card reader device as interlocked with the anti-skimming bracket 100 using the mounting hardware 130*f* may enable the card reader device to be removed from the support structure and the anti-skimming bracket 100** relatively easily and relatively quickly, for example for maintenance, replacement, and/or the like.

Although two examples are shown in FIGS. 15 and 16, the mounting plate 106 may include any number of patterns for accommodating any number of corresponding mounting configurations and card reader devices. Moreover, any mounting of openings 126 included in the mounting plate 130 that are not labeled and/or shown as being utilized by any of the exemplary patterns 154 and/or 160 may be used in other implementations for other mounting configurations not shown or described herein. One or more additional or alternative mounting openings 126 may be included within the mounting plate 106 in other implementations, for example: to accommodate a mounting configuration not shown herein; to accommodate the exemplary mounting configuration 158 and/or 164; and/or the like. The following clauses describe further aspects:

Clause Set A:

A1. An anti-skimming device comprising:

a base configured to be mounted to at least one of a support structure or a card reader device, the base comprising mounting openings configured to receive mounting hardware for securing the base to the at least one of the support structure or the card reader device; and an arm extending outward from the base, the arm comprising a flange extending such that a gap is defined between the flange and the base, the gap being configured to receive at least portion of the card reader device therein such that the flange of the arm overlaps a portion of a front side of the card reader device.

A2. The anti-skimming device of any preceding clause, wherein the mounting openings comprise at least first and second patterns, the first and second patterns being configured to accommodate respective first and second different mounting configurations of the support structure.

A3. The anti-skimming device of any preceding clause, wherein the mounting openings comprise at least first and second patterns, the first and second patterns being configured to accommodate respective first and second different mounting configurations of the card reader device.

A4. The anti-skimming device of any preceding clause, wherein a size of the gap is adjustable.

A5. The anti-skimming device of any preceding clause, wherein the arm comprises a slot that enables a length of the arm to be adjusted to selectively change a size of the gap.

A6. The anti-skimming device of any preceding clause, wherein an angle of at least a portion of the arm with respect to the base is adjustable.

A7. The anti-skimming device of any preceding clause, wherein the arm comprises a slot that enables an angle of at least a portion of the arm to be changed relative to the base to selectively change a shape of the gap.

A8. The anti-skimming device of any preceding clause, wherein the mounting hardware includes interlock members configured to interlock with the card reader device.

A9. The anti-skimming device of any preceding clause, wherein the mounting hardware comprises a security fastener that is configured to releasably hold the card reader device in an interlocked position with the base.

A10. The anti-skimming device of any preceding clause, wherein the gap is configured to receive the at least a portion of the card reader device therein such that the flange of the arm overlaps the at least a portion of at least one of: an end portion of the front side of the card reader device; an edge of the front side; a side of the front side; a bottom of the front side; a top of the front side; or a corner of the front side.

A11. The anti-skimming device of any preceding clause, wherein the gap is configured to receive at least a portion of at least one of: an end portion of the card reader device; an edge of the card reader device; a side of the card reader device; a bottom of the card reader device; a top of the card reader device; or a corner of the card reader device.

A12. The anti-skimming device of any preceding clause, wherein the base is configured to be mounted to the at least one of the support structure or the card reader device such that the base extends between the support structure and the card reader device.

A13. The anti-skimming device of any preceding clause, wherein at least a portion of the arm is detachably mounted to the base.

A14. The anti-skimming device of any preceding clause, wherein the flange extends outwardly from an end portion of the arm.

A15. The anti-skimming device of any preceding clause, wherein the front side of the card reader device includes at least a portion of a user interface of the card reader device.

A16. The anti-skimming device of any preceding clause, wherein the support structure comprises at least one of a stand, a pole, an arm, an extension, or a countertop.

A17. The anti-skimming device of any preceding clause, further comprising the support structure, the base being mounted to the support structure using the mounting hardware.

A18. The anti-skimming device of any preceding clause, wherein at least one of the base or the arm comprises a visual deterrent.

A19. The anti-skimming device of any preceding clause, wherein the mounting hardware comprises at least one of a fastener, a threaded fastener, a clip, a clamp, a latch, an interlock member, a snap-fit member, an interference fit member, a stand, a pole, an arm, or an extension.

Clause Set B:

B1. An anti-skimming bracket comprising:

a base configured to be mounted to at least one of a support structure or a card reader device, the base comprising mounting openings configured to receive mounting hardware for securing the base to the at least one of the support structure or the card reader device, wherein the mounting openings comprise at least first and second patterns configured to accommodate respective first and second different mounting configurations of at least one of the support structure or the card reader device; and an arm extending outward from the base, the arm comprising a flange extending such that a gap is defined between the flange and the base, the gap being configured to receive at least portion of the card reader device therein such that the flange of the arm overlaps a portion of a front side of the card reader device.

B2. The anti-skimming bracket of any preceding clause, wherein a size of the gap is adjustable.

B3. The anti-skimming bracket of any preceding clause, wherein the arm comprises a slot that enables a length of the arm to be adjusted to selectively change a size of the gap.

B4. The anti-skimming bracket of any preceding clause, wherein an angle of at least a portion of the arm with respect to the base is adjustable.

B5. The anti-skimming bracket of any preceding clause, wherein the arm comprises a slot that enables an angle of at least a portion of the arm to be changed relative to the base to selectively change a shape of the gap.

B6. The anti-skimming bracket of any preceding clause, wherein the mounting hardware includes interlock members that are configured to interlock with the card reader device.

B7. The anti-skimming bracket of any preceding clause, wherein the mounting hardware comprises a security fastener that is configured to releasably hold the card reader device in an interlocked position with the base.

B8. The anti-skimming bracket of any preceding clause, wherein the gap is configured to receive the at least a portion of the card reader device therein such that the flange of the arm overlaps the at least a portion of at least one of: an end portion of the front side of the card reader device; an edge of the front side; a side of the front side; a bottom of the front side; a top of the front side; or a corner of the front side.

B9. The anti-skimming bracket of any preceding clause, wherein the gap is configured to receive at least a portion of at least one of: an end portion of the card reader device; an edge of the card reader device; a side of the card reader device; a bottom of the card reader device; a top of the card reader device; or a corner of the card reader device.

B10. The anti-skimming bracket of any preceding clause, wherein the base is configured to be mounted to the at least one of a support structure or the card reader device such that the base extends between the support structure and the card reader device.

B11. The anti-skimming bracket of any preceding clause, wherein at least a portion of the arm is detachably mounted to the base.

B12. The anti-skimming bracket of any preceding clause, wherein the flange extends outwardly from an end portion of the arm.

B13. The anti-skimming bracket of any preceding clause, wherein the front side of the card reader device includes at least a portion of a user interface of the card reader device.

B14. The anti-skimming bracket of any preceding clause, wherein the support structure comprises at least one of a stand, a pole, an arm, an extension, or a countertop.

B15. The anti-skimming bracket of any preceding clause, further comprising the support structure, the base being mounted to the support structure using the mounting hardware.

B16. The anti-skimming bracket of any preceding clause, wherein at least one of the base or the arm comprises a visual deterrent.

B17. The anti-skimming bracket of any preceding clause, wherein the mounting hardware comprises at least one of a fastener, a threaded fastener, a clip, a clamp, a latch, an interlock member, a snap-fit member, an interference fit member, a stand, a pole, an arm, or an extension.

Clause Set C:

C1. An anti-skimming bracket comprising:

a base configured to be mounted to at least one of a support structure or a card reader device, the base comprising mounting openings configured to receive mounting hardware for securing the base to the at least one of the support structure or the card reader device, wherein the base is configured to be mounted to the at least one of the support structure or the card reader device such that the base extends between the support structure and the card reader device; and an arm extending outward from the base, the arm comprising a flange extending such that a gap is defined between the flange and the base, the gap being configured to receive at least portion of the card reader device therein such that the flange of the arm overlaps a portion of a front side of the card reader device, wherein a size of the gap is adjustable.

C2. The anti-skimming bracket of any preceding clause, wherein the mounting openings comprise at least first and second patterns, the first and second patterns being configured to accommodate respective first and second different mounting configurations of the support structure.

C3. The anti-skimming bracket of any preceding clause, wherein the mounting openings comprise at least first and second patterns, the first and second patterns being configured to accommodate respective first and second different mounting configurations of the card reader device.

C4. The anti-skimming bracket of any preceding clause, wherein the arm comprises a slot that enables a length of the arm to be adjusted to selectively change the size of the gap.

C5. The anti-skimming bracket of any preceding clause, wherein an angle of at least a portion of the arm with respect to the base is adjustable.

C6. The anti-skimming bracket of any preceding clause, wherein the arm comprises a slot that enables an angle of at least a portion of the arm to be changed relative to the base to selectively change a shape of the gap.

C7. The anti-skimming bracket of any preceding clause, wherein the mounting hardware includes interlock members that are configured to interlock with the card reader device.

C8. The anti-skimming bracket of any preceding clause, wherein the mounting hardware comprises a security fastener that is configured to releasably hold the card reader device in an interlocked position with the base.

C9. The anti-skimming bracket of any preceding clause, wherein the gap is configured to receive the at least a portion of the card reader device therein such that the flange of the arm overlaps the at least a portion of at least one of: an end portion of the front side of the card reader device; an edge of the front side; a side of the front side; a bottom of the front side; a top of the front side; or a corner of the front side.

C10. The anti-skimming bracket of any preceding clause, wherein the gap is configured to receive at least a portion of at least one of: an end portion of the card reader device; an edge of the card reader device; a side of the card reader device; a bottom of the card reader device; a top of the card reader device; or a corner of the card reader device.

C12. The anti-skimming bracket of any preceding clause, wherein at least a portion of the arm is detachably mounted to the base.

C13. The anti-skimming bracket of any preceding clause, wherein the flange extends outwardly from an end portion of the arm.

C14. The anti-skimming bracket of any preceding clause, wherein the front side of the card reader device includes at least a portion of a user interface of the card reader device.

C15. The anti-skimming bracket of any preceding clause, wherein the support structure comprises at least one of a stand, a pole, an arm, an extension, or a countertop.

C16. The anti-skimming bracket of any preceding clause, further comprising the support structure, the base being mounted to the support structure using the mounting hardware.

C17. The anti-skimming bracket of any preceding clause, wherein at least one of the base or the arm comprises a visual deterrent.

C18. The anti-skimming bracket of claim 1, wherein the mounting hardware comprises at least one of a fastener, a threaded fastener, a clip, a clamp, a latch, an interlock member, a snap-fit member, an interference fit member, a stand, a pole, an arm, or an extension.

Clause Set D:

D1. A method comprising:

mounting a base of an anti-skimming bracket to a support structure; and mounting a card reader device to at least one of the support structure or the anti-skimming bracket such that a flange of an arm of the anti-skimming bracket overlaps a portion of a front side of the card reader device.

D2. The method of any preceding clause, wherein mounting the card reader device to at least one of the support structure or the anti-skimming bracket comprises adjusting a size of a gap between the flange and the base.

D3. The method of any preceding clause, wherein mounting the card reader device to at least one of the support structure or the anti-skimming bracket comprises interlocking the card reader device with mounting hardware.

D4. The method of any preceding clause, wherein mounting the card reader device to at least one of the support structure or the anti-skimming bracket comprises releasably holding the card reader device in an interlocked position with the base using a security fastener.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one implementation or can relate to several implementations. The implementations are not limited to those that solve any or all of the stated problems or those that have any or all of the stated benefits and advantages. It will further be understood that reference to 'an' item refers to one or more of those items.

The order of execution or performance of the operations in examples of the present application illustrated and described herein is not essential, unless otherwise specified. That is, the operations can be performed in any order, unless otherwise specified, and examples of the application can include additional or fewer operations than those disclosed herein. For example, it is contemplated that executing or performing a particular operation before, contemporaneously with, or after another operation (e.g., different steps, etc.) is within the scope of aspects and implementations of the application.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Accordingly, and for example, unless explicitly stated to the contrary, implementations "comprising" or "having" an element or a plurality of elements having a particular property can include additional elements not having that property. Further, references to "one implementation" or "an implementation" are not intended to be interpreted as excluding the existence of additional implementations that also incorporate the recited features. The term "exemplary" is intended to mean "an example of".

When introducing elements of aspects of the application or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one." Accordingly, and for example, as used herein, an element or step recited in the singular and preceded by the word "a" or "an" should be understood as not necessarily excluding the plural of the elements or steps.

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the application in detail, it will be apparent that modifications and variations are possible without departing from the scope of aspects of the application as defined in the appended claims. As various changes could be made in the above constructions, products, and methods without departing from the scope of aspects of the application, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations of the application without departing from their scope. While the dimensions and types of materials described herein are intended to define the parameters of the various implementations of the application, the implementations are by no means limiting and are example implementations. Many other implementations will be apparent to those of ordinary skill in the art upon reviewing the above description. The scope of the various implementations of the application should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the application, including the best mode, and also to enable any person of ordinary skill in the art to practice the various implementations of the application, including making and using any devices or systems and performing any incorporated methods. The patentable scope of the various implementations of the application is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. An anti-skimming device comprising:

a base configured to be mounted to at least one of a support structure or a card reader device, the base comprising mounting openings configured to receive mounting hardware for securing the base to the at least one of the support structure or the card reader device; and an arm extending outward from the base, the arm comprising a flange extending such that a gap is defined between the flange and the base, the gap being configured to receive at least portion of the card reader device therein such that the flange of the arm overlaps a portion of a front side of the card reader device.

2. The anti-skimming device of claim 1, wherein the mounting openings comprise at least first and second patterns, the first and second patterns being configured to accommodate respective first and second different mounting configurations of the support structure.

3. The anti-skimming device of claim 1, wherein the mounting openings comprise at least first and second patterns, the first and second patterns being configured to accommodate respective first and second different mounting configurations of the card reader device.

4. The anti-skimming device of claim 1, wherein a size of the gap is adjustable.

5. The anti-skimming device of claim 1, wherein the arm comprises a slot that enables a length of the arm to be adjusted to selectively change a size of the gap.

6. The anti-skimming device of claim 1, wherein an angle of at least a portion of the arm with respect to the base is adjustable.

7. The anti-skimming device of claim 1, wherein the arm comprises a slot that enables an angle of at least a portion of the arm to be changed relative to the base to selectively change a shape of the gap.

8. The anti-skimming device of claim 1, wherein the mounting hardware includes interlock members that are configured to interlock with the card reader device.

9. The anti-skimming device of claim 1, wherein the mounting hardware comprises a security fastener that is configured to releasably hold the card reader device in an interlocked position with the base.

10. The anti-skimming device of claim 1, wherein the gap is configured to receive the at least a portion of the card reader device therein such that the flange of the arm overlaps the at least a portion of at least one of: an end portion of the front side of the card reader device; an edge of the front side; a side of the front side; a bottom of the front side; a top of the front side; or a corner of the front side.

11. The anti-skimming device of claim 1, wherein the gap is configured to receive at least a portion of at least one of: an end portion of the card reader device; an edge of the card reader device; a side of the card reader device; a bottom of the card reader device; a top of the card reader device; or a corner of the card reader device.

12. The anti-skimming device of claim 1, wherein the base is configured to be mounted to the at least one of the support structure or the card reader device such that the base extends between the support structure and the card reader device.

13. The anti-skimming device of claim 1, wherein at least a portion of the arm is detachably mounted to the base.

14. The anti-skimming device of claim 1, wherein the front side of the card reader device includes at least a portion of a user interface of the card reader device.

15. The anti-skimming device of claim 1, wherein the support structure comprises at least one of a stand, a pole, an extension, or a countertop.

16. The anti-skimming device of claim 1, wherein the mounting hardware comprises at least one of a fastener, a threaded fastener, a clip, a clamp, a latch, an interlock member, a snap-fit member, an interference fit member, a stand, a pole, an arm, or an extension.

17. An anti-skimming bracket comprising:

a base configured to be mounted to at least one of a support structure or a card reader device, the base comprising mounting openings configured to receive mounting hardware for securing the base to the at least one of the support structure or the card reader device, wherein the mounting openings comprise at least first and second patterns configured to accommodate respective first and second different mounting configurations of at least one of the support structure or the card reader device; and an arm extending outward from the base, the arm comprising a flange extending such that a gap is defined between the flange and the base, the gap being configured to receive at least portion of the card reader device therein such that the flange of the arm overlaps a portion of a front side of the card reader device.

18. The anti-skimming bracket of claim 17, wherein at least one of the base or the arm comprises a visual deterrent.

19. An anti-skimming bracket comprising:

a base configured to be mounted to at least one of a support structure or a card reader device, the base comprising mounting openings configured to receive mounting hardware for securing the base to the at least one of the support structure or the card reader device, wherein the base is configured to be mounted to the at least one of the support structure or the card reader device such that the base extends between the support structure and the card reader device; and an arm extending outward from the base, the arm comprising a flange extending such that a gap is defined between the flange and the base, the gap being configured to receive at least portion of the card reader device therein such that the flange of the arm overlaps a portion of a front side of the card reader device, wherein a size of the gap is adjustable.

20. The anti-skimming bracket of claim 19, wherein the mounting hardware comprises a security fastener that is configured to releasably hold the card reader device in an interlocked position with the base.

* * * * *